US009871544B2

(12) United States Patent
Mercer et al.

(10) Patent No.: US 9,871,544 B2
(45) Date of Patent: Jan. 16, 2018

(54) SPECIFIC ABSORPTION RATE MITIGATION

(71) Applicant: Microsoft Corporation, Redmond, WA (US)

(72) Inventors: Sean Russell Mercer, Issaquah, WA (US); Mahesh M. Pai, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/905,088

(22) Filed: May 29, 2013

(65) Prior Publication Data

US 2014/0357313 A1    Dec. 4, 2014

(51) Int. Cl.
*H04M 1/00* (2006.01)
*H04B 1/3827* (2015.01)
(Continued)

(52) U.S. Cl.
CPC ......... *H04B 1/3838* (2013.01); *H04B 7/0426* (2013.01); *H04W 52/367* (2013.01); *H04W 88/06* (2013.01); *Y02B 60/50* (2013.01)

(58) Field of Classification Search
CPC .............. H04B 1/3838; H04B 7/18563; H04B 5/0037; H04B 7/0404; H04B 7/0602; H04B 7/0608; H04B 1/02; H04B 1/0458; H04B 2001/0416; H04B 7/0613; H04B 7/0689; H04B 7/0695; H04B 7/082;
(Continued)

(56) References Cited

U.S. PATENT DOCUMENTS 4,016,490 A    4/1977    Weckenmann et al.
4,729,129 A    3/1988    Koerner
(Continued)

FOREIGN PATENT DOCUMENTS

CN    1123476 A    5/1996
CN    1179864 A    4/1998
(Continued)

OTHER PUBLICATIONS

"International Search Report and Written Opinion", Application No. PCT/US2014/042023, Aug. 29, 2014, 11 Pages.
(Continued)

*Primary Examiner* — Golam Sorowar
(74) *Attorney, Agent, or Firm* — Holzer Patel Drennan

(57) ABSTRACT

Specific Absorption Rate (SAR) mitigation techniques are described herein. In one or more embodiments, a host device is configured to implement a SAR mitigation algorithm to maintain compliance with regulatory requirements. The SAR mitigation algorithm may be configured to control radio frequency transmissions (e.g., output levels) for one or more antennas of the host device based at least in part upon an arrangement of an accessory device relative to the host device. By so doing, the SAR mitigation algorithm accounts for adverse influences that accessory devices may have upon radio frequency (RF) emissions from the antennas in some arrangements. The SAR mitigation algorithm may be further configured to account for user presence indications along with accessory device arrangements and adapt transmission power levels accordingly.

19 Claims, 8 Drawing Sheets

(51) Int. Cl.
  *H04W 88/06* (2009.01)
  *H04W 52/36* (2009.01)
  *H04B 7/0426* (2017.01)

(58) Field of Classification Search
  CPC .............. H04W 52/367; H04W 52/283; H04W 52/288; H04W 52/04; H04W 52/228; H04W 4/02; H04W 52/226; H04W 52/28; H04W 52/34; H04W 52/365; H04W 52/42; H04W 52/246
  See application file for complete search history.

(56) References Cited

U.S. PATENT DOCUMENTS

| | | | |
|---|---|---|---|
| 4,806,944 | A | 2/1989 | Jacomb-Hood |
| 5,166,679 | A | 11/1992 | Vranish et al. |
| 5,212,621 | A | 5/1993 | Panter |
| 5,408,690 | A | 4/1995 | Ishikawa et al. |
| 5,564,086 | A | 10/1996 | Cygan et al. |
| 6,178,310 | B1 | 1/2001 | Jeong, II |
| 6,657,595 | B1 | 12/2003 | Phillips et al. |
| 6,989,745 | B1 | 1/2006 | Milinusic et al. |
| 7,009,944 | B1 | 3/2006 | Hulbert |
| 7,053,629 | B2 | 5/2006 | Nevermann |
| 7,062,288 | B2 | 6/2006 | Raaf et al. |
| 7,071,776 | B2 | 7/2006 | Forrester et al. |
| 7,124,193 | B1 | 10/2006 | Raaf et al. |
| 7,146,139 | B2 | 12/2006 | Nevermann |
| 7,151,382 | B1 | 12/2006 | Kean et al. |
| 7,162,264 | B2 | 1/2007 | Vance |
| 7,167,093 | B2 | 1/2007 | Fergusson |
| 7,541,874 | B2 | 6/2009 | Maeda et al. |
| 7,729,715 | B2 | 6/2010 | Love et al. |
| 7,917,175 | B2 | 3/2011 | Song et al. |
| 8,063,375 | B2 | 11/2011 | Cobbinah et al. |
| 8,134,461 | B2 | 3/2012 | Van Doorn |
| 8,208,423 | B2 | 6/2012 | Liu et al. |
| 8,213,982 | B2 | 7/2012 | Marlett et al. |
| 8,269,511 | B2 | 9/2012 | Jordan |
| 8,324,549 | B2 | 12/2012 | Romero et al. |
| 8,326,385 | B2 | 12/2012 | Brogle et al. |
| 8,401,851 | B2 | 3/2013 | Bushey |
| 8,417,296 | B2 | 4/2013 | Caballero et al. |
| 8,432,322 | B2 | 4/2013 | Amm et al. |
| 8,442,572 | B2 | 5/2013 | Borran et al. |
| 8,466,839 | B2 | 6/2013 | Schlub et al. |
| 8,483,632 | B2 | 7/2013 | Asrani et al. |
| 8,515,496 | B2 | 8/2013 | Cheng et al. |
| 8,520,586 | B1 | 8/2013 | Husted et al. |
| 8,547,952 | B2 | 10/2013 | Liu et al. |
| 8,548,388 | B2 | 10/2013 | Chiu et al. |
| 8,559,999 | B2 | 10/2013 | Hu et al. |
| 8,565,205 | B2 | 10/2013 | Ho et al. |
| 8,577,289 | B2 | 11/2013 | Schlub et al. |
| 8,723,531 | B2 | 5/2014 | Harrison |
| 8,723,749 | B2 | 5/2014 | Lin et al. |
| 8,775,103 | B1 | 7/2014 | Jayaraj et al. |
| 8,781,437 | B2 | 7/2014 | Ngai et al. |
| 8,792,930 | B1 | 7/2014 | Gopalakrishnan et al. |
| 8,798,695 | B1 | 8/2014 | Zheng et al. |
| 8,860,526 | B2 | 10/2014 | Manssen et al. |
| 8,922,443 | B2 | 12/2014 | Zhu et al. |
| 8,975,903 | B2 | 3/2015 | Salter et al. |
| 9,325,355 | B2 | 4/2016 | Pecen et al. |
| 9,337,833 | B2 | 5/2016 | Siska |
| 9,466,872 | B2 | 10/2016 | Sanchez et al. |
| 2002/0009976 | A1 | 1/2002 | Rashidi |
| 2002/0039028 | A1 | 4/2002 | Douglas et al. |
| 2002/0175814 | A1 | 11/2002 | Wadlow et al. |
| 2003/0064732 | A1 | 4/2003 | McDowell et al. |
| 2003/0064761 | A1 | 4/2003 | Nevermann |
| 2003/0210203 | A1 | 11/2003 | Phillips et al. |
| 2003/0214310 | A1 | 11/2003 | McIntosh |
| 2003/0228846 | A1 | 12/2003 | Berliner et al. |
| 2004/0021608 | A1 | 2/2004 | Kojima et al. |
| 2004/0075613 | A1 | 4/2004 | Jarmuszewski et al. |
| 2004/0108957 | A1 | 6/2004 | Umehara et al. |
| 2004/0113847 | A1 | 6/2004 | Qi et al. |
| 2004/0160378 | A1 | 8/2004 | Abrams et al. |
| 2004/0222925 | A1 | 11/2004 | Fabrega-Sanchez et al. |
| 2005/0017906 | A1 | 1/2005 | Man et al. |
| 2005/0093624 | A1 | 5/2005 | Forrester et al. |
| 2005/0184914 | A1 | 8/2005 | Ollikainen et al. |
| 2006/0244663 | A1 | 11/2006 | Fleck et al. |
| 2007/0037619 | A1 | 2/2007 | Matsunaga et al. |
| 2007/0111681 | A1 | 5/2007 | Alberth, Jr. et al. |
| 2007/0120745 | A1 | 5/2007 | Qi et al. |
| 2007/0122307 | A1 | 5/2007 | Da Costa et al. |
| 2008/0051165 | A1 | 2/2008 | Burgan et al. |
| 2008/0055160 | A1 | 3/2008 | Kim et al. |
| 2008/0158065 | A1 | 7/2008 | Wee |
| 2008/0218493 | A1 | 9/2008 | Patten et al. |
| 2008/0254836 | A1 | 10/2008 | Qi et al. |
| 2009/0033562 | A1 | 2/2009 | Takeuchi et al. |
| 2009/0047998 | A1 | 2/2009 | Alberth, Jr. |
| 2009/0230884 | A1 | 9/2009 | Van Doorn |
| 2009/0253459 | A1 | 10/2009 | Naganuma et al. |
| 2009/0295648 | A1 | 12/2009 | Dorsey et al. |
| 2009/0305742 | A1 | 12/2009 | Caballero et al. |
| 2009/0325511 | A1 | 12/2009 | Kim |
| 2010/0026664 | A1 | 2/2010 | Geaghan |
| 2010/0052997 | A1 | 3/2010 | Kan et al. |
| 2010/0056210 | A1* | 3/2010 | Bychkov et al. .......... 455/556.1 |
| 2010/0067419 | A1 | 3/2010 | Liu et al. |
| 2010/0113111 | A1 | 5/2010 | Wong et al. |
| 2010/0234058 | A1 | 9/2010 | Hu et al. |
| 2010/0234081 | A1 | 9/2010 | Wong et al. |
| 2010/0279751 | A1 | 11/2010 | Pourseyed et al. |
| 2010/0283671 | A1 | 11/2010 | Levin et al. |
| 2010/0283691 | A1 | 11/2010 | Su et al. |
| 2010/0317302 | A1 | 12/2010 | Greenwood et al. |
| 2010/0321325 | A1 | 12/2010 | Springer et al. |
| 2011/0001675 | A1 | 1/2011 | Lee |
| 2011/0012793 | A1 | 1/2011 | Amm et al. |
| 2011/0012794 | A1 | 1/2011 | Schlub et al. |
| 2011/0043408 | A1 | 2/2011 | Shi et al. |
| 2011/0063042 | A1 | 3/2011 | Mendolia et al. |
| 2011/0117973 | A1 | 5/2011 | Asrani et al. |
| 2011/0124363 | A1 | 5/2011 | Calvarese et al. |
| 2011/0157077 | A1 | 6/2011 | Martin et al. |
| 2011/0199267 | A1 | 8/2011 | Hayashi |
| 2011/0222469 | A1 | 9/2011 | Ali et al. |
| 2011/0250928 | A1 | 10/2011 | Schlub et al. |
| 2011/0298669 | A1 | 12/2011 | Rao |
| 2012/0021707 | A1 | 1/2012 | Forrester et al. |
| 2012/0021800 | A1 | 1/2012 | Wilson et al. |
| 2012/0023225 | A1 | 1/2012 | Imes et al. |
| 2012/0044115 | A1 | 2/2012 | Mccaughey et al. |
| 2012/0071195 | A1 | 3/2012 | Chakraborty et al. |
| 2012/0074961 | A1 | 3/2012 | Herrmann |
| 2012/0077538 | A1 | 3/2012 | Yun |
| 2012/0133561 | A1 | 5/2012 | Konanur et al. |
| 2012/0147801 | A1 | 6/2012 | Ho et al. |
| 2012/0172079 | A1 | 7/2012 | Baldemair et al. |
| 2012/0178494 | A1 | 7/2012 | Haim et al. |
| 2012/0190398 | A1 | 7/2012 | Leukkunen |
| 2012/0214422 | A1 | 8/2012 | Shi et al. |
| 2012/0223865 | A1 | 9/2012 | Li et al. |
| 2012/0231784 | A1 | 9/2012 | Kazmi |
| 2012/0270519 | A1 | 10/2012 | Ngai et al. |
| 2012/0270592 | A1 | 10/2012 | Ngai et al. |
| 2012/0276861 | A1 | 11/2012 | Isobe et al. |
| 2012/0295554 | A1 | 11/2012 | Greene et al. |
| 2012/0298497 | A1 | 11/2012 | Maeda et al. |
| 2012/0299772 | A1 | 11/2012 | Shtrom et al. |
| 2012/0315847 | A1 | 12/2012 | Li et al. |
| 2012/0329517 | A1 | 12/2012 | Elin |
| 2012/0329524 | A1 | 12/2012 | Kent et al. |
| 2013/0005413 | A1 | 1/2013 | Brogle et al. |
| 2013/0016621 | A1 | 1/2013 | Kil et al. |
| 2013/0026846 | A1 | 1/2013 | Gianesello et al. |
| 2013/0033400 | A1 | 2/2013 | Chiang |
| 2013/0045700 | A1 | 2/2013 | Stallman et al. |
| 2013/0050046 | A1 | 2/2013 | Jarvis et al. |

(56) References Cited

U.S. PATENT DOCUMENTS

| | | |
|---|---|---|
| 2013/0051261 A1 | 2/2013 | Kazmi et al. |
| 2013/0060517 A1 | 3/2013 | Sanchez |
| 2013/0120257 A1 | 5/2013 | Park et al. |
| 2013/0122827 A1 | 5/2013 | Ali et al. |
| 2013/0127677 A1 | 5/2013 | Lin et al. |
| 2013/0137487 A1* | 5/2013 | Sato ............................ 455/566 |
| 2013/0149957 A1 | 6/2013 | Desclos et al. |
| 2013/0157564 A1 | 6/2013 | Curtis et al. |
| 2013/0164962 A1 | 6/2013 | Lin et al. |
| 2013/0169348 A1 | 7/2013 | Shi |
| 2013/0178167 A1 | 7/2013 | Lockerbie et al. |
| 2013/0178174 A1* | 7/2013 | Geris et al. .................. 455/90.3 |
| 2013/0203363 A1 | 8/2013 | Gratt et al. |
| 2013/0210477 A1 | 8/2013 | Peter et al. |
| 2013/0217342 A1 | 8/2013 | Abdul-gaffoor et al. |
| 2013/0241670 A1 | 9/2013 | Mikhemar et al. |
| 2013/0278474 A1 | 10/2013 | Lenormand et al. |
| 2013/0293244 A1 | 11/2013 | Leek |
| 2013/0300618 A1 | 11/2013 | Yarga et al. |
| 2013/0310105 A1 | 11/2013 | Sagae et al. |
| 2013/0310106 A1 | 11/2013 | Wang et al. |
| 2013/0314365 A1 | 11/2013 | Woolley et al. |
| 2014/0015595 A1 | 1/2014 | Van Ausdall et al. |
| 2014/0021801 A1 | 1/2014 | Kao et al. |
| 2014/0066124 A1 | 3/2014 | Novet |
| 2014/0071008 A1 | 3/2014 | Desclos et al. |
| 2014/0078094 A1 | 3/2014 | Yang |
| 2014/0087663 A1 | 3/2014 | Burchill et al. |
| 2014/0098491 A1 | 4/2014 | Wang |
| 2014/0098693 A1 | 4/2014 | Tabet et al. |
| 2014/0128032 A1 | 5/2014 | Muthukumar |
| 2014/0139380 A1 | 5/2014 | Ouyang et al. |
| 2014/0141733 A1 | 5/2014 | Wong et al. |
| 2014/0152121 A1 | 6/2014 | Ku |
| 2014/0155000 A1 | 6/2014 | Erkens |
| 2014/0159980 A1 | 6/2014 | Finegold |
| 2014/0173269 A1 | 6/2014 | Varoglu et al. |
| 2014/0176938 A1 | 6/2014 | Yang et al. |
| 2014/0206297 A1 | 7/2014 | Schlub et al. |
| 2014/0274188 A1 | 9/2014 | Thorson |
| 2014/0274189 A1 | 9/2014 | Moller et al. |
| 2014/0280450 A1 | 9/2014 | Luna |
| 2014/0292587 A1 | 10/2014 | Yarga et al. |
| 2014/0307570 A1 | 10/2014 | Hong |
| 2014/0315592 A1 | 10/2014 | Schlub et al. |
| 2014/0357207 A1 | 12/2014 | Ma |
| 2014/0357313 A1 | 12/2014 | Mercer et al. |
| 2014/0370929 A1 | 12/2014 | Khawand et al. |
| 2015/0031408 A1 | 1/2015 | Kalla et al. |
| 2015/0053575 A1 | 2/2015 | Bridges et al. |
| 2015/0141080 A1 | 5/2015 | Standing |
| 2015/0169093 A1 | 6/2015 | Nakao |
| 2015/0177371 A1 | 6/2015 | Abbasi et al. |
| 2015/0199042 A1 | 7/2015 | Standing et al. |
| 2015/0200444 A1 | 7/2015 | Mercer et al. |
| 2015/0201385 A1 | 7/2015 | Mercer et al. |
| 2015/0201387 A1 | 7/2015 | Khawand et al. |
| 2015/0288074 A1 | 10/2015 | Harper et al. |
| 2015/0382307 A1 | 12/2015 | Harper et al. |
| 2016/0049978 A1 | 2/2016 | Mercer et al. |
| 2016/0064801 A1 | 3/2016 | Han et al. |
| 2016/0098053 A1 | 4/2016 | Khawand et al. |
| 2016/0164563 A1 | 6/2016 | Khawand et al. |
| 2016/0204836 A1 | 7/2016 | Lee et al. |

FOREIGN PATENT DOCUMENTS

| | | |
|---|---|---|
| CN | 100504407 | 6/2009 |
| CN | 102064812 | 5/2011 |
| CN | 102077234 A | 5/2011 |
| CN | 202276339 U | 6/2012 |
| CN | 102714346 A | 10/2012 |
| CN | 102835036 A | 12/2012 |
| CN | 103248747 | 8/2013 |
| EP | 0843421 | 5/1998 |
| EP | 1298809 | 4/2003 |
| EP | 1469550 | 12/2004 |
| EP | 1732167 | 12/2006 |
| EP | 2015548 | 2/2010 |
| EP | 2276108 | 1/2011 |
| EP | 2381527 A1 | 10/2011 |
| EP | 2383364 | 11/2011 |
| EP | 2405534 | 1/2012 |
| EP | 2410661 | 1/2012 |
| EP | 2509229 | 10/2012 |
| EP | 2568605 A1 | 3/2013 |
| EP | 2787780 | 10/2014 |
| GB | 2380359 | 4/2003 |
| GB | 2409345 | 6/2005 |
| JP | 2002043957 A | 2/2002 |
| JP | 2007194995 | 8/2007 |
| WO | WO-0042797 | 7/2000 |
| WO | WO-0148858 | 7/2001 |
| WO | WO-2004015813 | 2/2004 |
| WO | WO-2004091046 | 10/2004 |
| WO | WO-2005018046 | 2/2005 |
| WO | WO-2007043150 | 4/2007 |
| WO | 20090149023 A1 | 12/2009 |
| WO | 2011058128 A1 | 5/2011 |
| WO | WO 2011051554 | 5/2011 |
| WO | WO-2012152103 | 2/2012 |
| WO | WO-2012061582 | 5/2012 |
| WO | WO-2012091651 | 7/2012 |
| WO | 2012113754 | 8/2012 |
| WO | 2012122113 A1 | 9/2012 |
| WO | 2012133113 A1 | 9/2012 |
| WO | WO 2012122116 | 9/2012 |
| WO | 2012143936 | 10/2012 |
| WO | WO-2012176217 | 12/2012 |
| WO | 2013011352 A1 | 1/2013 |
| WO | 2013101106 | 7/2013 |
| WO | WO-2013103948 | 7/2013 |
| WO | 2013141791 A1 | 9/2013 |
| WO | WO-2013165419 | 11/2013 |
| WO | WO-2013169527 | 11/2013 |
| WO | 2014036532 A1 | 3/2014 |
| WO | 2015134117 A1 | 9/2015 |
| WO | 2016111897 A1 | 7/2016 |

OTHER PUBLICATIONS

"International Search Report and Written Opinion", Application No. PCT/US2014/039479, Sep. 19, 2014, 11 Pages.

"Low SAR Solution for Tablet PC", Retrieved at <<http://www.auden.com.tw/TRC/webspace/disk/AudenSARSolutiondatasheet_110927.pdf>>, In Auden—Data Sheet, Sep. 27, 2011, pp. 2.

Toit, Riaan Du, "Using Proximity Sensing to Meet Mobile Device FCC SAR Regulations", Retrieved at <<http://www.eetimes.com/General/PrintView/4371201>>, Apr. 17, 2012, pp. 5.

"Semtech Launches Smart Proximity Sensor for Short-Range Human Presence Detection & SAR Regulations in Mobile & Tablet PC Applications", Retrieved at <<http://www.semtech.com/Press-Releases/2012/Semtech-Launches-Smart-Proximity-Sensor-for-Short-Range-Human-Presence-Detection-SAR-Regulations-in-Mobile-Tablet-PC-Applications.html>>, Jul. 24, 2012, pp. 2.

Mercer, Sean R., et al., "Specific Absorption Rate Mitigation", U.S. Appl. No. 13/905,088, (May 29, 2013), 52 pages.

"Digital, Silicon Microphone has 2.6×1.6 $mm^2$ Footprint", Available at: http://news.thomasnet.com/fullstory/Digital-Silicon-Microphone-has-2-6-x-1-6-mm-footprint-471386, Dec. 28, 2005, 2 pages.

Holopainen, et al.,' "Broadband Equivalent Circuit Model for Capacitive Coupling Element-Based Mobile Terminal Antenna", In IEEE Antennas and Wireless Propagation Letters, vol. 9,, Jul. 8, 2010, pp. 716-719.

Khawand, et al.,' "Radio Frequency (RF) Power Back-Off Optimization for Specific Absorption Rate (SAR) Compliance", U.S. Appl. No. 13/918,846, Jun. 14, 2013, 40 pages.

Ozyalcin, et al.,' "SAR Simulations in Wireless Communication and Safety Discussions in the Society", In Proceedings of Turkish Journal of Electrical Engineering & Computer Sciences, vol. 10,

(56) References Cited

OTHER PUBLICATIONS

Issue 2, Retrieved from <http://www3.dogus.edu.tr/lsevgi/LSevgi/FULL/2002-O.pdf> on Dec. 31, 2013,2002, 16 pages.
"Second Written Opinion", U.S. Appl. No. PCT/US2014/042023, Mar. 2, 2015, 6 Pages.
"Non-Final Office Action", U.S. Appl. No. 14/152,351, Feb. 20, 2015, 9 pages.
"International Search Report and Written Opinion", Application No. PCT/US2014/072411, Mar. 27, 2015, 10 pages.
"International Search Report and Written Opinion", Application No. PCT/US2014/072412, Mar. 30, 2015, 12 pages.
"International Search Report and Written Opinion", Application No. PCT/US2014/072414, Apr. 14, 2015, 9 Pages.
Mrazovac,"Reaching the Next Level of Indoor Human Presence Detection: An RF Based Solution", 11th International Conference on Telecommunications in Modern Satellite, Cable and Broadcasting Services, Oct. 16, 2013, 4 pages.
"International Preliminary Report on Patentability", Application No. PCT/US2014/039479, dated Jun. 15, 2015, 8 pages.
"Non-Final Office Action", U.S. Appl. No. 14/152,086, dated Jul. 22, 2015, 13 pages.
"Notice of Allowance", U.S. Appl. No. 14/152,351, dated Jul. 7, 2015, 8 pages.
"Restriction Requirement", U.S. Appl. No. 13/918,846, dated Jul. 10, 2015, 8 pages.
"International Search Report and the Written Opinion", Application No. PCT/US2014/072413, dated Jul. 16, 2015, 16 pages.
"Non-Final Office Action", U.S. Appl. No. 13/918,846, dated Sep. 23, 2015, 16 pages.
"Non-Final Office Action", U.S. Appl. No. 14/152,529, dated Sep. 22, 2015, 17 pages.
"Non-Final Office Action", U.S. Appl. No. 14/152,652, dated Jul. 16, 2015, 8 pages.
Bonez, "Parametric Study of Antenna with Parasitic Element for Improving the Hearing Aids Compatibility of Mobile Phones and the Specific Absorption Rate in the Head", Mar. 2011, pp. 1885-1889.
Curto, "Circular Loop Antenna Operating at 434 MHz for Medical Applications: Loop-Tissue Interaction", In Proceedings of Irish Signals and Systems Conference, Jul. 2006, 6 pages.
Poutanen, "Behavior of Mobile Terminal Antennas near Human Tissue at a Wide Frequency Range", In International Workshop on Antenna Technology: Small Antennas and Novel Metamaterials, Mar. 4, 2008, pp. 219-222.
Poutanen, "Interaction Between Mobile Terminal Antenna and User", Helsinki University of Technology Master's Thesis, Oct. 9, 2007, 100 pages.
Sterner, "Development of an Antenna Sensor for Occupant Detection in Passenger Transportation", In Proceedings of Procedia Engineering, vol. 47, Sep. 2012, pp. 178-183.
Khawand, et al., "Radiating Structure with Integrated Proximity Sensing" formerly titled as "SAR Sensor Execution where Part of One or More Antennas is on the Exterior Surface of a Mobile Device", unfiled U.S. Patent Application, (filed herewith).
U.S. Appl. No. 13/918,846, Pai, et al., "Radio Frequency (RF) Power Back-Off Optimization for Specific Absorption Rate (SAR) Compliance", filed Jun. 14, 2013.
International Searching Authority, United States Patent and Trademark Office, International Search Report and Written Opinion for Application No. PCT/US2014/072411, dated Mar. 27, 2015, 10 pages.
International Searching Authority, U.S. Patent and Trademark Office, Written Opinion for PCT/US2014/072411, dated Mar. 27, 2015, 6 pages.
International Searching Authority, U.S. Patent and Trademark Office, Updated Search Report for PCT/US2014/072412, dated Aug. 5, 2015, 3 pages.
International Searching Authority, U.S. Patent and Trademark Office, Updated Written Opinion for PCT/US2014/072412, dated Aug. 5, 2015, 8 pages.

"SAR Evaluation Considerations for Laptop, Notebook, Netbook and Tablet Computers," Federal Communications Commision Office of Engineering and Technology Laboratory Division, May 28, 2013, 14 pages.
Hochwald, et al., "Minimizing Exposure to Electromagnetic Radiation in Portable Devices", In Proceedings of Information Theory and Applications Workshop, Feb. 5, 2012, pp. 7.
Myllymaki, Sami "Capacitive Antenna Sensor for Proximity Recognition"; http://herkules.oulu.fi/isbn9789514299155/isbn9789514299155.pdf, dated Nov. 30, 2012, 60 pages.
International Searching Authority, United States Patent and Trademark Office, Second Written Opinion of IPEA for PCT/US2014/065856, dated Oct. 13, 2015, 6 pages.
"Non-Final Rejection Issued in U.S. Appl. No. 14/927,287", dated Dec. 21, 2015, 28 Pages.
International Searching Authority, U.S. Patent and Trademark Office, International Search Report and Written Opinion for PCT/US2015/037563, dated Aug. 20, 2015, dated Aug. 31, 2015, 11 pages.
International Searching Authority, U.S. Patent and Trademark Office, Written Opinion of International Preliminary Examining Authority for PCT/US2014/072412, dated Nov. 26, 2015, 7 pages.
International Searching Authority, U.S. Patent and Trademark Office, International Search Report and Written Opinion for PCT/US2014/072413 dated Jul. 16, 2015, 16 pages.
International Searching Authority, U.S. Patent and Trademark Office, Written Opinion of the International Preliminary Examining Authority for PCT/US2014/072413 dated Dec. 17, 2015, 6 pages.
International Preliminary Examining Authority, International Preliminary Report on Patentability for PCT/US2014/065856, dated Feb. 10, 2016, 8 pages
International Preliminary Examining Authority, Second Written Opinion of the International Preliminary Examining Authority for PCT/2014/065856, dated Oct. 13, 2015, 6 pages.
International Seraching Authority, U.S. Patent and Trademark Office, International Search Report and Written Opinion for PCT/US2015/062851, dated Jan. 28, 2016, dated Feb. 5, 2016, 11 pages.
International Searching Authority, U.S. Patent and Trademark Office, International Search Report and Written Opinion for PCT/US2015/052769, dated Feb. 17, 2016, 27 pages.
Rogerson, James, "Samsung reveals a folding phone-to-tablet prototype", http://www.techradar.com/us/news/phone-and-communications/mobile..nes/samsung-reveals-a-folding-phone-to-tablet-prototype-1197384, 7 pages.
Mercer, et al., "Dynamic Antenna Power Control for Multi-Context Device", U.S. Appl. No. 14/987,964, filed Jan. 5, 2016, 52 pages.
"Non-Final Office Action", U.S. Appl. No. 13/905,088, dated Mar. 23, 2015, 37 pages.
"Non-Final Office Action", U.S. Appl. No. 14/152,086, dated Nov. 30, 2015, 19 pages.
"Non-Final Office Action", U.S. Appl. No. 14/562,212, dated Dec. 18, 2015, 16 pages.
"Final Office Action", U.S. Appl. No. 14/152,652, dated Dec. 23, 2016, 9 pages.
"Non-Final Office Action", U.S. Appl. No. 14/320,320, dated Jan. 21, 2016, 9 pages.
"Non-Final Office Action", U.S. Appl. No. 14/152,529, dated Jan. 22, 2016, 18 pages.
Office Action Issued in United Kingdom Patent Application No. 1219096.3, dated January 28, 2016, 4 Pages.
"Final Office Action", U.S. Appl. No. 13/918,846, dated Mar. 2, 2016, 20 pages.
"Non-Final Office Action", U.S. Appl. No. 14/152,652, dated Apr. 18, 2016 9 pages.
"Final Office Action Issued in U.S. Appl. No. 14/927,287", dated May 11, 2016, 34 Pages.
"Non-Final Office Action", U.S. Appl. No. 14/086,866, dated May 19, 2016, 7 pages.
Office Action Issued in Chinese Patent Application No. 201380055749.X, dated June 6, 2016, 12 Pages.
"Non-Final Office Action", U.S. Appl. No. 13/918,846, dated Jun. 14, 2016, 21 pages.

(56) References Cited

OTHER PUBLICATIONS

"Final Office Action", U.S. Appl. No. 14/562,212, dated Jun. 17, 2016, 17 pages.
"Non-Final Office Action", U.S. Appl. No. 14/506,478, dated Jul. 1, 2016, 10 pages.
"Final Office Action", U.S. Appl. No. 14/320,320, dated Jul. 29, 2016, 10 pages.
International Searching Authority, United States Patent and Trademark Office, International Search Report and Written Opinion for Application No. PCT/US2013/066441, dated Dec. 12, 2013, 12 Pages.
International Preliminary Examining Authority, United States Patent and Trademark Office, International Preliminary Report on Patentability, Application No. PCT/US2013/066441, dated May 7, 2015, 9 pages.
International Searching Authority, United States Patent and Trademark Office, Second International Search Report and Written Opinion for PCT/US2014/072412; dated Oct. 5, 2015, 11 pages.
Second Written Opinion Issued in PCT Application No. PCT/US2014/072411, dated Nov. 26, 2015, 7 Pages.
International Searching Authority, U.S. Patent and Trademark Office, Second Written Opinion of the International Preliminary Examining Authority for PCT/US2014/072414 dated Dec. 9, 2015, 29 pages.
International Preliminary Report of Patentability issued in PCT Application No. PCT/US2014/072412; dated Mar. 22, 2016, 7 pages.
International Preliminary Examining Authority, International Preliminary Report on Patentability for PCT/US2014/072411; dated Mar. 23, 2016, 8 pages.
International Preliminary Examining Authority, International Preliminary Report on Patentability for PCT/US2014/072414;dated Mar. 23, 2016, 7 pages.
International Preliminary Examining Authority, International Preliminary Report on Patentability for PCT/US52014/072413, dated Mar. 24, 2016, 7 pages.
International Preliminary Examining Authority, Second Written Opinion of the International Preliminary Examining Authority for PCT/2015/037563, dated Jun. 1, 2016, 5 pages.
Second Written Opinion Issued in PCT Application No. PCT/US2015/052769, dated Jul. 7, 2016, 5 Pages.
Hochwald, et al "Minimizing Exposure to Electromagnetic Radiation in Portable Devices", In Proceedings of Information Theory and Applications Workshop, Feb. 5, 2012, pp. 7.
Myllymaki, "Capacitive Antenna Sensor for User Proximity Recognition"; Academic dissertation to be presented with the assent of the Doctoral Training Committee of Technology and Natural Sciences of the University of Oulu for public defence in Arina-sali (Auditorium TA105), Linnanmaa, dated Nov. 30, 2012, 59 pages.
"SAR Evaluation Considerations for Laptop, Notebook, Netbook and Tablet Computers," Federal Communications Commission Office of Engineering and Technology Laboratory Division, May 28, 2013, 14 pages.
"Non-Final Office Action", U.S. Appl. No. 14/086,865, dated Oct. 17, 2016, 7 pages.
"Final Office Action", U.S. Appl. No. 13/918,846, dated Oct. 26, 2016, 25 pages.
Office Action Issued in Columbian Patent Application No. NC2016/0000122, dated Aug. 19, 2016, 2 Pages.
First Office Action and Search Report Issued in Chinese Patent Application No. 201480031132.9, dated Nov. 2, 2016, 10 Pages.
International Searching Authority, United States Patent and Trademark Office, Search Report and Written Opinion for PCT/US2014/065856, dated Feb. 4, 2015, 10 pages.
International Preliminary Examining Authority, International Preliminary Report on Patentability for PCT/US2015/037563, dated Sep. 13, 2016, 11 pages.
International Preliminary Examining Authority, International Preliminary Report on Patentability for PCT/US2015/052769, dated Sep. 29, 2016, 16 pages.
International Searching Authority, U.S. Patent and Trademark Office, Second Written Opinion of the International Preliminary Examining Authority for PCT/US2015/062851, dated Oct. 28, 2016, 8 pages.
Ban, et al., "A Dual-Loop Antenna Design for Hepta-Band WWAN/LTE Metal-Rimmed Smartphone Applications", In Journal of IEEE Transactions on Antennas and Propagation, vol. 63, Issue 1, Jan. 2015, 8 pages.
Chung, et al., "A dual-mode antenna for wireless charging and Near Field Communication", In Proceedings of EEE International Symposium on Antennas and Propagation & USNC/URSI National Radio Science Meeting, Jul. 24, 2015, 5 pages.
Design of Printed Trace Differential Loop Antennas, http://www.silabs.com/Support%20Documents/TechnicalDocs/AN639.pdf, Retrieved on: Nov. 17, 2016, 28 pages.
Mumcu, et al., "Small Wideband Double-Loop Antennas Using Lumped Inductors and Coupling Capacitors", In Journal of IEEE Antennas and Wireless Propagation Letters, vol. 10, Feb. 4, 2011, 5 pages.
Osoinach, Bryce, "Proximity Capacitive Sensor Technology for Touch Sensing Applications", In White Paper of Proximity Sensing, 2007, 7 pages.
Pal, et al., "A low-profile switched-beam dual-band capacitively couples Square Loop Antenna", In Proceedings of Antennas and Propagation Conference, Nov. 11, 2013, 5 Pages.
Pal, et al., "Dual-Band Low-Profile Capacitively Coupled Beam-Steerable Square-Loop Antenna", In Journal of IEEE Transactions on Antennas and Propagation, vol. 62, Issue 3, Mar. 2014, pp. 1204-1211.
Quddious, et al., "An inkjet printed meandered dipole antenna for RF passive sensing applications". In Proceedings of 10th European Conference on Antennas and Propagation, Apr. 2016, 4 Pages.
Standing, et al., "Radiofrequency-Wave-Transparent Capacitive Sensor Pad", U.S. Appl. No. 15/384,742, filed Dec. 20, 2016, 26 pages.
Harper et al., "Active Proximity Sensor With Adaptive Electric Field Control", U.S. Appl. No. 15/413,196, filed Jan. 23, 2016, 35 pages. Npharper et al., "Active Proximity Sensor With Adaptive Electric Field Control", U.S. Appl. No. 15/413,196, filed Jan. 23, 2017, 35 pages.
Harper, "Loop Antenna With Integrated Proximity Sensing", U.S. Appl. No. 15/412,997, filed Jan. 23, 2017, 32 pages.
"Non-Final Office Action", U.S. Appl. No. 14/987,964, dated Nov. 30, 2016, 8 pages.
Office Action and Search Report Issued in Chinese Patent Application No. 201480033869.4, dated Dec. 19, 2016, 7 Pages.
"Second Office Action Issued in Chinese Patent Application No. 201380055749.X", dated Jan. 25, 2017, 10 Pages.
Office Action and Search Report Issued in Chinese Patent Application No. 201480063903.02, dated Apr. 19, 2017, 11 Pages.
International Preliminary Examining Authority, International Preliminary Report on Patentability for PCT/US2015/062851, dated Feb. 22, 2017, 19 pages.
International Searching Authority, U.S. Patent and Trademark Office, International Search Report and Written Opinion for PCT/US2016/069056, dated Mar. 31, 2017, 17 pages.
"Office Action Issued in Chinese Patent Application No. 201380055749.X", dated Jun. 12, 2017, 8 Pages.
Second Office Action and Search Report Issued in Chinese Patent Application No. 201480031132.9, dated Jul. 26, 2017, 12 Pages.
Final Office Action Issued in U.S. Appl. No. 14/927,287, dated Mar. 13, 2017, 23 Pages.

* cited by examiner

SPECIFIC ABSORPTION RATE MITIGATION

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on. Modern mobile computing devices may incorporate multiple antennas to support various wireless subsystems and communications. The multiple antennas may include for example one or more Wi-Fi, Bluetooth, global navigation satellite system (GNSS), near field communication (NFC) and/or cellular antennas.

One challenge faced by mobile computing device designers is adherence to regulatory requirements that are imposed by entities such as the Federal Communication Commission (FCC), the European Union (EU), and so forth. An example of such regulatory requirements is legal limits on Specific Absorption Rate (SAR) that are established in relation to radio frequency (RF) energy associated with the various wireless and communications subsystems of a mobile computing device. A traditional solution for achieving compliance with SAR limits involves setting a fixed maximum RF transmit power for communication hardware (e.g., radios) to a power level that maintains legal compliance in the presence of a user. However, placing such a fixed maximum on the transmit power underutilizes the capabilities of communication hardware and may adversely affect communication connections and/or quality. Additionally, add-on hardware and/or accessory devices connectable to a host device may have adverse influences upon RF emissions of the host device that typically are not accounted for in traditional mitigation approaches. Thus, traditional techniques for SAR compliance may be inadequate for some device configurations and use scenarios.

SUMMARY

Specific Absorption Rate (SAR) mitigation techniques are described herein. In one or more embodiments, a host device is configured to implement a SAR mitigation algorithm to maintain compliance with regulatory requirements. The SAR mitigation algorithm may be configured to control radio frequency transmissions (e.g., output levels) for one or more antennas of the host device based at least in part upon an arrangement of an accessory device relative to the host device. By so doing, the SAR mitigation algorithm accounts for adverse influences that accessory devices may have upon radio frequency (RF) emissions from the antennas in some arrangements. The SAR mitigation algorithm may be further configured to account for user presence indications along with accessory device arrangements and adapt transmission power levels accordingly.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

One challenge faced by mobile computing device designers is adherence to Specific Absorption Rate (SAR) limits that are established in relation to radio frequency (RF) emissions by mobile devices. A traditional solution involves setting a fixed maximum RF transmit power across all communication hardware, however, this approach generally sets a cautiously low maximum to maintain compliance at the expense of communication connection performance and/or quality.

Specific Absorption Rate (SAR) mitigation techniques are described herein. In one or more embodiments, a host device is configured to implement a SAR mitigation algorithm to maintain compliance with regulatory requirements. The SAR mitigation algorithm may be configured to control radio frequency transmissions (e.g., output levels) for one or more antennas of the host device based at least in part upon an arrangement of an accessory device relative to the host device. By so doing, the SAR mitigation algorithm accounts for adverse influences that some arrangements of accessory devices may have upon radio frequency (RF) emissions from the antennas. The SAR mitigation algorithm may be further configured to account for user presence indications along with accessory device arrangement and adapt transmission power levels accordingly.

In the following discussion, an example environment and devices are first described that may employ the techniques described herein. Example details and procedures are then described which may occur in the example environment and by the devices as well as in other environments and by other devices. Consequently, the example details and procedures are not limited to the example environment/devices and the example environment/devices are not limited to performance of the example details and procedures.

Example Operating Environment

Figure 1:
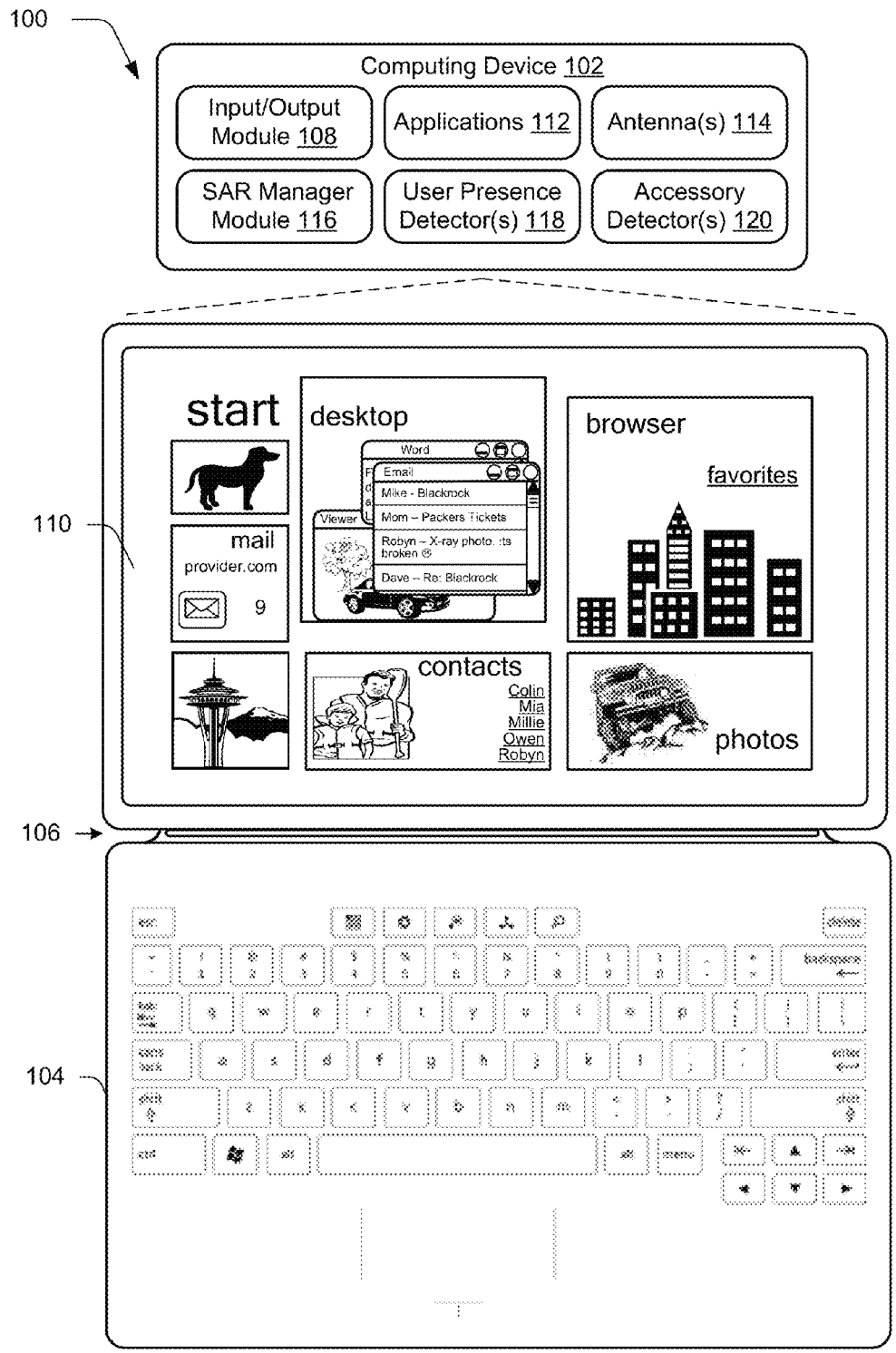
FIG. 1 is an illustration of an environment in an example implementation that is operable to employ the techniques described herein.

FIG. 1 is an illustration of an environment 100 in an example implementation that is operable to employ the techniques described herein. The illustrated environment 100 includes an example of a computing device 102 that is physically and communicatively coupled to an accessory device 104 via a flexible hinge 106. In this case the computing device 102 may be considered a host device to which one or more accessory devices 104 are connectable in different arrangements. The computing device 102 may be configured in a variety of ways. For example, the computing device 102 may be configured for mobile use, such as a mobile phone, a tablet computer as illustrated, and so on. Thus, the computing device 102 may range from full resource devices with substantial memory and processor resources to a low-resource device with limited memory and/or processing resources. The computing device 102 may also relate to software that causes the computing device 102 to perform one or more operations.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the input device, keys of a virtual keyboard displayed by the display device 110 to identify gestures and cause operations to be performed that correspond to the gestures that may be recognized through the accessory device 104 and/or touchscreen functionality of the display device 110, and so forth. Thus, the input/output module 108 may support a variety of different input techniques by recognizing and leveraging a division between types of inputs including key presses, gestures, and so on.

In the illustrated example, the accessory device 104 is a device configured as a keyboard having a QWERTY arrangement of keys although other arrangements of keys are also contemplated. Further, other non-conventional configurations for an accessory device 104 are also contemplated, such as a game controller, configuration to mimic a musical instrument, a power adapter, an accessory to provide wireless functionality, and so forth. Thus, the accessory device 104 may assume a variety of different configurations to support a variety of different functionality. Different accessory devices may be connected to the computing device at different times and in different arrangements relative to the computing device 102 (e.g., host device).

As previously described, the accessory device 104 is physically and communicatively coupled to the computing device 102 in this example through use of a flexible hinge 106. The flexible hinge 106 represents one illustrative example of an interface that is suitable to connect and/or attach and accessory device to a computing device 102 acting as a host. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one direction (e.g., vertically in the figure) yet restrict movement in other directions, such as lateral movement of the accessory device 104 in relation to the computing device 102. This may be used to support consistent alignment of the accessory device 104 in relation to the computing device 102, such as to align sensors used to change power states, application states, and so on.

The flexible hinge 106, for instance, may be formed using one or more layers of fabric and include conductors formed as flexible traces to communicatively couple the accessory device 104 to the computing device 102 and vice versa. This communication, for instance, may be used to communicate a result of a key press to the computing device 102, receive power from the computing device, perform authentication, provide supplemental power to the computing device 102, and so on. The flexible hinge 106 or other interface may be configured in a variety of ways to support multiple different accessory devices 104, further discussion of which may be found in relation to the following figure.

As further illustrated in FIG. 1 the computing device 102 may include various applications 112 that provide different functionality to the device. A variety of applications 112 typically associated with computing devices are contemplated including, but not limited to, an operating system, a productivity suite that integrates multiple office productivity modules, a web browser, games, a multi-media player, a word processor, a spreadsheet program, a photo manager, and so forth.

The computing device 102 further includes one or more antennas 114 that are representative of various antennas employed by the computing device to implement wireless functionality, subsystems, and communications. In accordance with techniques described herein, the antennas 114 may include multiple different kinds of antennas (e.g., radios) that are arranged together within one or more antennas zones established for the computing device. In general, the antennas 114 may be placed to minimize interference between antennas and/or achieve performance objectives for the suite of antennas as a whole. The placement of the antennas 114 may also minimize areas of the computing device 102 and/or accessory device 104 which have restrictions that limit the materials and componentry that may be placed with or near to the antenna suite 114. Areas with such restrictions may be referred to as radio frequency (RF) keep outs. A variety of different types of antennas, combinations of different types of antennas, and arrangements of antennas are contemplated.

In accordance with SAR mitigation techniques described herein, the computing device 102 may be further configured to implement a SAR mitigation algorithm to maintain compliance with regulatory requirements. As mentioned, the SAR mitigation algorithm may be configured to control transmission power levels for antennas 114 and thus RF emissions in dependence upon arrangement of the accessory device relative to the computing device, user presence indications, accessory identification data, and/or other factors considered individually or in combination. As shown in FIG. 1, the computing device may include a SAR manager module 116, one or more user presence detectors 118, and one or more accessory detectors 120. The SAR manager module 116 represents functionality operable to implement a SAR mitigation algorithm and to control antennas 114 to maintain SAR compliance in various scenarios. The SAR manager module 116 may be implemented as a standalone module, as firmware of one or more antennas/communication subsystems, as a component of an operating system or other application 112 (e.g., an antenna performance and communication manager application), and so forth. To control antenna operations, the SAR manager module 116 may be configured to obtain user presence indications from user presence detectors 118 and data indicative of an arrangement of the accessory device 104 from accessory detectors 120. SAR manager module 116 may also obtain and/or make use of accessory device identification data to identify different accessories, determine properties of the accessory devices, and distinguish between accessories. The user presence detectors 118 and accessory detectors 120 are representative of suitable hardware, software, firmware, logic and combinations thereof to obtain user presence indications and data indicative accessory device arrangements, respectively, and to supply such information for use by the SAR manager module 116. A variety of different physical sensors, sensor arrangements, and techniques for the user presence detectors 118 and accessory detectors 120 may be employed, examples of which are discussed in relation to the following figures.

Figure 2:
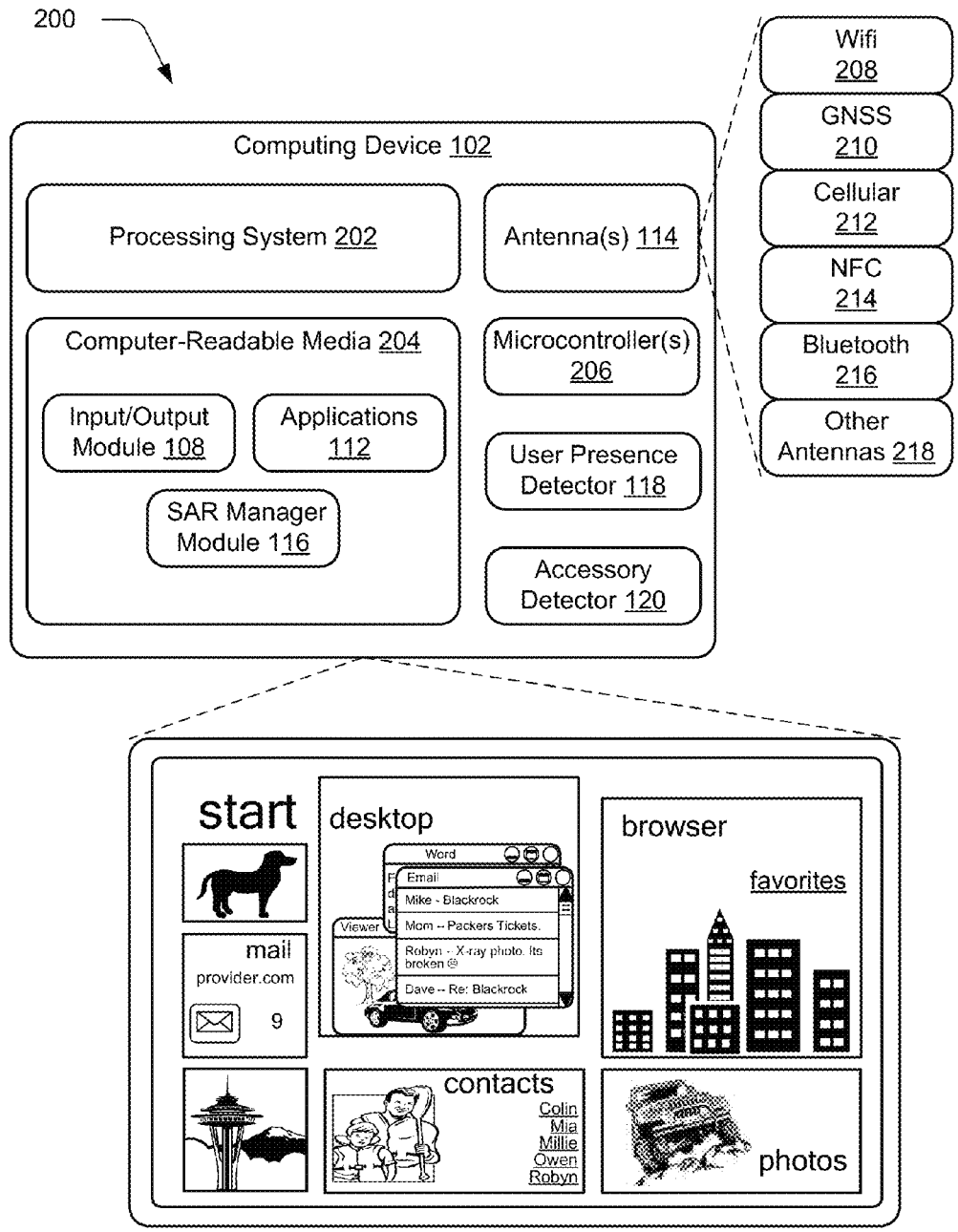
FIG. 2 depicts an example implementation of a computing device of FIG. 1 in greater detail.

To further illustrate, consider FIG. 2 which depicts generally at 200 an example computing device 102 of FIG. 1 in greater detail. In the depicted example, the computing device 102 is shown in a stand-alone configuration without an accessory device 104 being attached. In addition to the components discussed in relation to FIG. 1, the example computing device of FIG. 2 further includes a processing system 202 and computer-readable media 204 that are representative of various different types and combinations of processing components, media, memory, and storage components and/or devices that may be associated with a computing device and employed to provide a wide range of device functionality. In at least some embodiments, the processing system 202 and computer-readable media 204 represent processing power and memory/storage that may be employed for general purpose computing operations. In the depicted example, the computer-readable media 204 is illustrated as storing the input/output module 108, application 112, and SAR manager module 116, which may be executed via the processing system 202. More generally, the computing device 102 may be configured as any suitable computing system and/or device that employ various processing systems and computer-readable media to implement functionality described herein, additional details and examples of which are discussed in relation to the example computing system of FIG. 8.

The computing device 102 may also implement selected device functionality through one or more microcontrollers 206. The microcontrollers 206 represent hardware devices/systems that are designed to perform a predefined set of designated tasks. The microcontrollers 206 may represent respective on-chip systems/circuits having self-contained resources such as processing components, I/O devices/peripherals, various types of memory (ROM, RAM, Flash, EEPROM), programmable logic, and so forth. Different microcontrollers may be configured to provide different embedded applications/functionality that are implemented at least partially in hardware and perform corresponding tasks. For example, the SAR manager module 116 may be implemented via a microcontroller of the device in some implementations. The microcontrollers 206 enable performance of some tasks outside of operation of a general purpose processing system and other applications/components of the computing device or accessory device. Generally, power consumption of the microcontrollers is low in comparison with operating a general purpose processing system for a device. Additionally, the microcontrollers 206 may enable wireless communication systems of the device to remain on when the general purpose processing system is powered down and provide an always on always connected (AOAC) feature.

As further depicted, a variety of different types of antennas 114 are contemplated as represented in FIG. 2. By way of example, the antennas 114 may include one or more Wi-Fi 208 antennas, global navigation satellite system (GNSS) 210 antennas, cellular 212 antennas, Near Field Communication (NFC) 214 antennas, Bluetooth 216 antennas, and/or other 218 antennas. In accordance with techniques described herein, the antennas 114 may include multiple antennas that may be interdependent upon one another and/or are arranged/designed in combination. In some scenarios, some wireless technologies may be implemented using two or more individual radios/antennas.

For instance, the Wi-Fi 208 antennas may employ a two-by-two multiple input/multiple output configuration (e.g., 2×2 MIMO). The Wi-Fi 208 antennas may include at least a main and a MIMO antenna in some configurations. In addition, a Bluetooth 216 antenna may optionally be combined with the Wi-Fi 208 antennas. Further, modern cellular technologies such as Long Term Evolution (LTE), WiMax, and/or 4G may employ two or more cellular 212 antennas, such as a main cellular antenna and a MIMO cellular antenna and cover various frequencies, geographic areas, and so forth. The GNSS 210 antennas may be configured for use with various types of navigation standards, technologies, and systems including but not limited to GPS, GLONASS, Galileo, and/or BeiDou navigation systems, to name some examples.

The computing device 102 of FIG. 2 also includes an example user presence detector 118 and an example accessory detector 120. The user presence detector 118 may be implemented in various ways. In this example, user presence detector 118 is configured as a hardware sensor capable of detecting and indicating presence of a user relative to the computing device and/or relative to particular regions of the device for which SAR mitigation is relevant. For example, a user presence detector 118 may be located proximate to antennas 114 to indicate when a user is positioned in a manner relative to the antennas 114 that would increase or decrease the likelihood of exceeding SAR limits. For instance, placing a hand over a region having one or more of the antennas 114 to hold a device may increase the amount of RF energy that the user is exposed to. On the other hand, some device hand positions for holding a device may be at a sufficient distance from the antennas 114 to reduce exposure and permit higher RF energy outputs without causing SAR violations. Further, SAR compliance may depend in general upon whether or not a user is physically interacting with the device and the context of interaction.

Thus, if the device is set down to watch a media presentation or placed on a table after use, the level of potential exposure decreases. User actions with a device such as typing, gestures, selecting buttons, and other types of input may be indicative of user presence. These and other contextual factors regarding usage of the device may be considered along with information obtained directly from user presence detectors 118 to determine when and how to adjust antenna output. By way of example, user presence detectors 118 employed by a device may include but are not limited to capacitive sensors, infrared radiation (IR) sensors, pressure sensors, optical detectors, a camera, and/or other type of sensors capable of determining a relationship of a user relative to the device and supplying such information as user presence indications.

Likewise, the accessory detector 120 may be implemented in various ways. The accessory detectors 120 may be implemented as hardware sensors placed in various locations on a host device and/or on an accessory device itself. By way of example, accessory detectors 120 employed by a device may include but are not limited to capacitive sensors, pressure sensors/switch, gyroscopes, accelerometers, optical detectors, magnetic field detectors, (e.g., hall effect sensors), mechanical switches, and/or other type of sensors that may be used individually or in combinations to determine arrangement of an accessory device relative to a host. As used herein, the arrangement of an accessory device may include whether or not the accessory is connected to the host, a location of the accessory, an orientation of the accessory relative the host, an accessory identifier, and so forth.

In particular, one or more accessory detectors 120 may be included with a device to detect whether or not an accessory device is physically connected to a host device. This may involve determining accessory device identification data using any suitable mechanism and/or accessory detectors 120. For example, accessory device identification data may be communicated via an interface (e.g., flexible hinge 106) that connects and/or attaches an accessory device to a computing device 102. The accessory device identification data may be communicated when the accessory is attached and may be stored by computing device 102 for reference and use by different modules/applications including the SAR mitigation module 116. Attachment of the accessory may be recognized using one or more accessory detectors 120 associated with the interface. The accessory device identification data may be configured as an alphanumeric code or string, a textual device name, a hardware identifier, or other suitable identifying data. The accessory device identification data is sufficient to distinguish between different accessories and ascertain associated properties, characteristics, and capabilities of the accessories that may be used to inform SAR mitigation techniques as well as other operations.

Additionally, for accessory devices that may be manipulated into different arrangements, the accessory detectors 120 may be configured to detect the different arrangements of accessory devices relative to a host device to which the accessory devices are connected. In one approach, the accessory detectors 120 are placed upon one or more surfaces of a host device and are operable to determine when an accessory is positioned in a manner that causes interference with regions of the device in which antennas are housed. In some arrangements, the accessory may alter RF energy emissions in a manner that can direct more or less emissions toward a user. By recognizing the different arrangements of accessory devices and understanding how the antenna emissions are changed in different arrangements, antennas may be controlled in a manner that achieves compliance with SAR limits while enabling AOAC features for communication systems and informed adjustments to antenna output under differing conditions that may boost performance and quality of communications overall. Further details regarding example arrangements of accessory detectors 120 as well as user presence detectors 118 are discussed in relation to the following figures.

Having discussed an example environment and devices, consider now some example details regarding SAR mitigation techniques in accordance with various implementations.

SAR Mitigation Details

Figure 3:
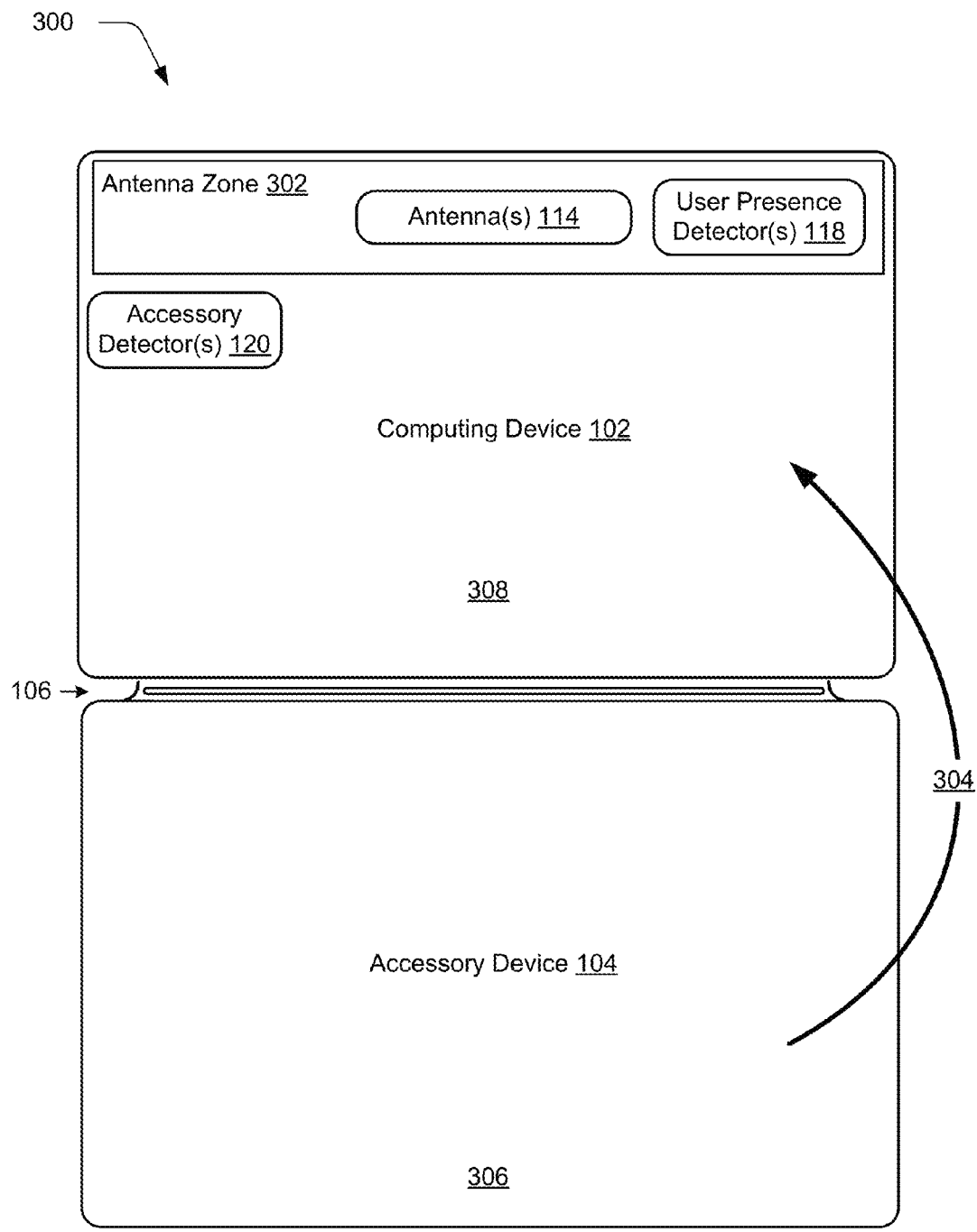
FIG. 3 depicts an example implementation of detectors for a host device to implement SAR mitigation techniques in dependence upon accessory device arrangement.

The following discussion presents some details regarding SAR mitigation techniques and some illustrative examples. FIG. 3 depicts generally at 300 one example implementation of detectors used to inform a SAR mitigation algorithm. In particular, the computing device 102 is depicted as including an antenna zone 302 having various antennas 114. Various combinations of antennas may be provided with a device. As depicted, the antenna zone 302 may be arranged along a selected edge of the computing device 102. In the illustrated example, the antenna zone 302 extends substantially across a top edge of the device in a landscape orientation. Other edges and/or multiple edges may also be selected some examples of which are discussed in relation to the following figures.

A user presence detector 118 is also depicted in FIG. 3 as being associated with the antenna zone 302 and corresponding antennas 114. Generally, user presence detectors 118 may be placed within or proximate to an antenna zone 302 and/or in relation to individual antennas to detect when a user is "present." The presence of a user in the context of SAR mitigation refers to whether the relationship of the user to a device encroaches upon the antenna zone 302 and corresponding antennas 114 to an extent that potential for the user to be exposed to RF emissions above SAR limits is increased to an unacceptable level. A user may be considered present under conditions that increase potential exposure to unacceptable levels and considered not present when the user is sufficiently removed from the antenna zone 302 and corresponding antennas 114. Presence may be indicated for different antennas or groups of antennas of a device on an individual basis. Thus a user may be considered present with respect to some antennas and at the same time considered not present with respect to other antennas of a particular device.

User presence may be indicated for instance, when the user contacts areas of the device at or near to portions of the device that house antennas (e.g., the antenna zone). Thus, if a user holds the example computing device 102 of FIG. 3 along the top edge, the example one or more user presence detectors 118 associated with the antenna zone 302 may recognize this user interaction and generate an indication of user presence for consumption by a SAR manager module 116. On the other hand, if a user places the computing device 102 down on a desk or table or holds the device at a different location, near the flexible hinge 106 for example, the user is sufficiently removed from the antenna zone 302 so that exceeding SAR limits becomes unlikely or impossible. In this case, the user may be considered not present with respect to the relationship of the user to antennas of the device and associated RF emissions. One or more user presence detectors 118 are provided to recognize the relationship of a user to RF emitting hardware components and to cause the SAR manager module 116 to take action to mitigate exposure under appropriate conditions.

FIG. 3 additionally depicts an example accessory detector 120 associated with the computing device 102. In this case, the example accessory detector 120 may be a physical device that is placed in a location to detect when the accessory device is covering a surface of the computing device 102. For example, the arrow 304 indicates that the accessory device 104 may be manipulated via a flexible hinge 106 (or other suitable interface) into different arrangements. In one arrangement, the accessory device may be folded over into a closed position such that a surface 306 of the accessory device 104 covers a surface 308 of the computing device. In this arrangement, the accessory device 104 also covers the antenna zone 302 and antennas. Accordingly, the accessory device 104 may cause some interference and/or deflection of RF energy emitted by the antennas. Thus, the accessory detector 120 is positioned to detect arrangement of the accessory device into the closed position and initiate actions by the SAR manager module 116 to mitigate exposure. One or more accessory detectors may be arranged at different locations to recognize corresponding arrangements and initiate mitigation actions for SAR compliance as appropriate.

Figure 4:
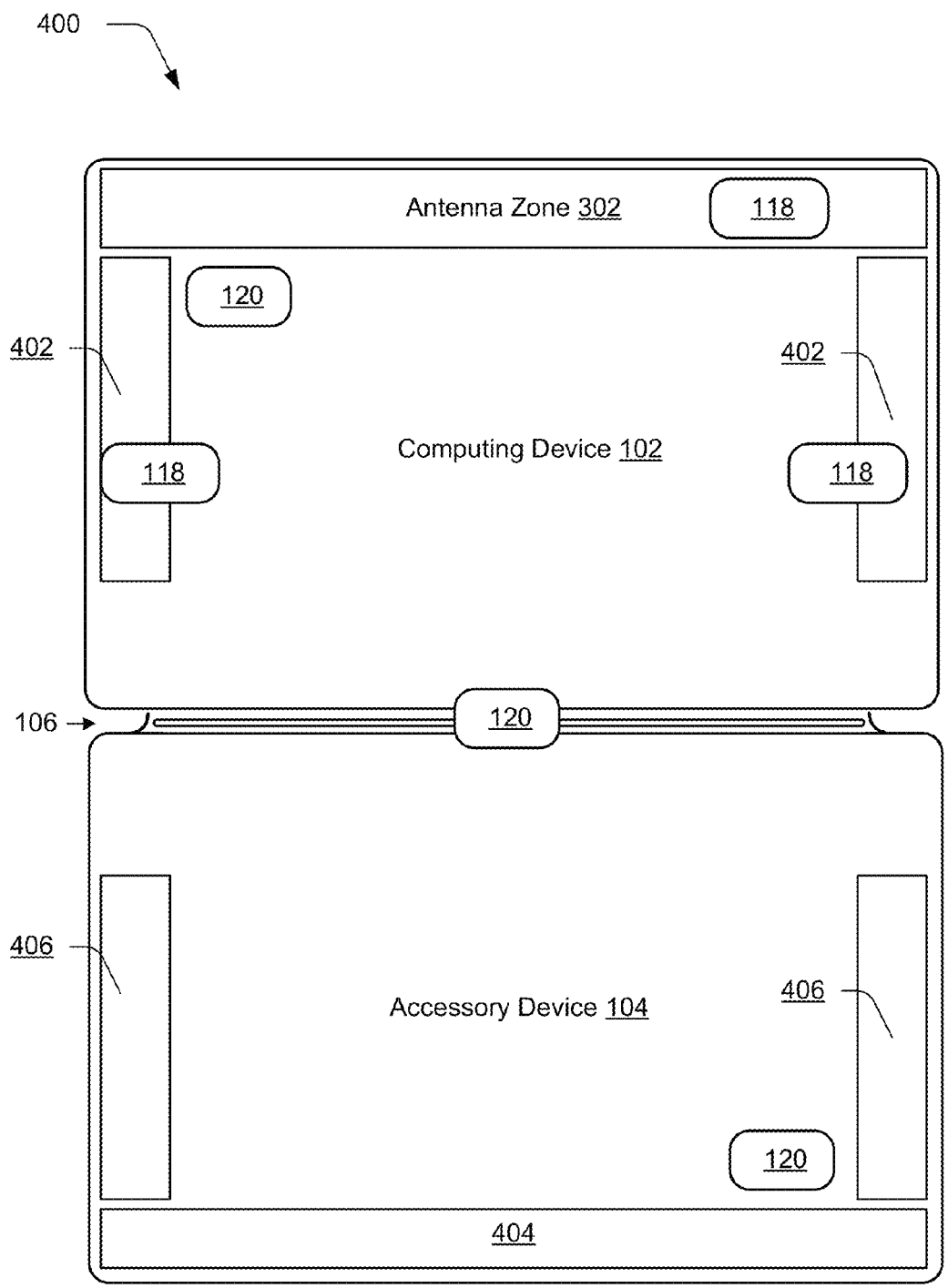
FIG. 4 depicts further example arrangements for detectors of a host device to implement SAR mitigation techniques in dependence upon accessory device arrangement.

FIG. 4 depicts generally at 400 additional example arrangements of detectors that may be employed to inform a SAR mitigation algorithm. Generally, FIG. 4 represents that one or multiple user presence detectors 118 may be employed in combination with one or multiple accessory detectors 120 to implement SAR mitigation techniques described herein. In particular, example placements and aspects of detectors that may be employed for the described SAR mitigation techniques are illustrated. In the depiction, the antenna zone 302 of FIG. 3 that extends across top edge of the computing device 102 in a landscape orientation is again included along with a corresponding user presence detector 118. In addition or alternatively, the computing device 102 may include one or more other antenna zones 402 examples of which are shown along the short edges of the computing device in FIG. 4. As further shown in FIG. 4, each of the antennas zones may include respective antennas and may be associated with one or more user presence detectors 118 configured to determine user presence with respect to corresponding zones and antennas in the manner described above and below.

Further, the accessory device 104 of FIG. 4 is illustrated as including area 404 and areas 406 that correspond to antenna zone 302 and other antennas zones 402, respectively. In particular, the area 404 and areas 406 represent portions of the accessory device 104 that may interfere with antenna performance in some arrangements of the accessory device 104 relative to a host computing device. For example, the area 404 and areas 406 may cover antenna zone 302 and other antennas zones 402 when the accessory device 104 is manipulated into a closed position as discussed in relation to FIG. 3. This may cause deflection of RF energy and/or other consequences that may adversely affect SAR compliance and/or performance. In some designs, non-interfering materials (e.g., RF transparent plastic, paint, and so forth) may be selected for area 404 and areas 406 to avoid such consequences. This approach though limits the types of materials available for accessories. The use of accessory detectors 120 and a mitigation scheme as described herein enables design freedom to use a wide range of materials and configurations for accessories while achieving both acceptable communication performance/quality and SAR compliance.

Accordingly, one or multiple accessory detectors 120 may be employed to determine arrangements of an accessory device 104 relative to a computing device 102. As shown in FIG. 4, accessory detectors 120 may be associated with one or more of the computing device 102, an interface used to communicatively and physically couple an accessory to a host (such as a flexible hinge 106), and/or the accessory device 104 itself. Multiple accessory detectors 120 may be used in combination to identify different accessory devices, determine different arrangements of accessory devices, recognize when accessories are connected/disconnected, determine where accessory devices are located, ascertain properties associated with different accessory devices, and so forth. Various information regarding accessory devices and arrangements including but not limited to the preceding examples may be obtained at least in part via accessory detectors 120 and used by the SAR manager module 116 to selectively adjust antenna operation in dependence on accessory device arrangements and properties to balance performance and SAR compliance in different circumstances.

Figure 5:
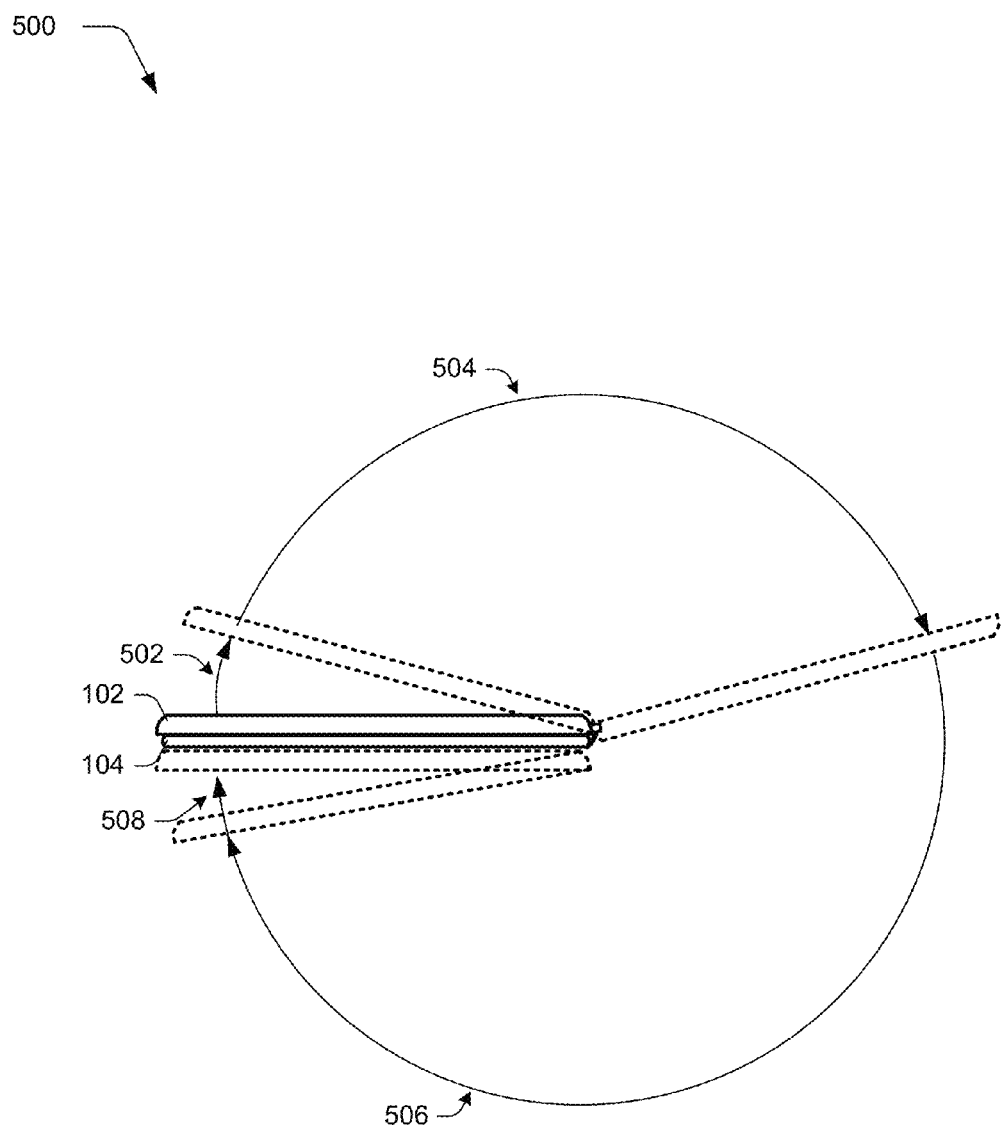
FIG. 5 depicts illustrates some example rotational orientations of a host device in relation to an accessory device.

FIG. 5 illustrates generally at 500 an example in which a computing device 102 may be rotated within a variety of different angle ranges with respect to an accessory device 104 that correspond to different arrangements. Generally, different arrangements of an accessory device 104 relative to a computing device 102 may occur at different times. The accessory device 104 may also be removably connectable to the computing device 102 via a flexible hinge 106 or other suitable interface. In different arrangements, the different antennas and/or antenna zones may become more or less effective for various kinds of wireless communication. For example, different zones may become blocked and unblocked as the accessory is manipulated into different arrangements.

Different arrangements can be associated with different power states, different application states, use of different wireless antennas/antennas zones, and so on. Additionally, the different arrangements and/or select pre-defined arrangements may be recognized and used to inform a SAR mitigation algorithm implemented by the SAR manager module 116. Naturally, different accessories may have different characteristics and capabilities including different kinds of arrangements that may occur relative to a host. Techniques for SAR mitigation discussed herein are generally applicable to various different arrangements associated with different accessories and are not limited to the illustrative examples discussed above and below.

In the example of FIG. 5 an angle range 502 is illustrated, which corresponds to a closed position in which a front surface (e.g., input side or key side of a keyboard accessory) of the accessory device 104 may cover a front surface (e.g., display side) of the computing device 102. The closed position may be detected via accessory detectors 120 as discussed herein or in another suitable way. Thus, if the computing device 102 is positioned at an angle within the angle range 502 relative to the accessory device 104, the computing device 102 can be determined to be in a closed position. A closed position can include an associated closed state where various functionalities/behaviors for the computing device 102 and accessory device 104 including antenna operations can be modified accordingly based on the closed state. This may include switching between different antenna zones, selectively turning antennas on/off, selecting various wireless functionality provided by one or more antennas 114, modifying power output for SAR compliance and/or to improve performance, and so forth. Within the angle range 502 for instance, the accessory may cause interference with antenna operation. In this case, the SAR manager module 116 may be configured to recognize that the accessory device 104 is positioned in an arrangement that adversely affects SAR compliance and may take action to control antennas for SAR compliance accordingly. For instance, RF transmit power may be reduced for one or more antennas to maintain SAR compliance.

Further illustrated is an angle range 504, which may correspond to a typing arrangement for the computing device 102. Thus, if the computing device 102 is positioned at an angle within the angle range 504 relative to the accessory device 104, the computing device 102 can be determined to be in a typing arrangement. Within this orientation, the computing device 102 and/or the accessory device 104 can be placed in a typing power state where functionalities/behaviors for the computing device 102 and accessory device 104 including antenna operations can be customized accordingly based on the typing state.

Additionally, FIG. 5 illustrates an angle range 506, which corresponds to a viewing arrangement for the computing device 102. Thus, if the computing device 102 is positioned at an angle within the angle range 506 relative to the accessory device 104, the computing device 102 can be determined to be in a viewing arrangement. In this orientation, functionalities/behaviors for the computing device 102 and accessory device 104 including antenna operations can be controlled accordingly based on the viewing state.

Generally, within the angle ranges 504 and 506, interference with antenna operation by the accessory device 104 may be minimal. In this case, the SAR manager module 116 may be configured to recognize that the accessory device 104 is positioned in an arrangement that does not adversely affect SAR compliance and may take action to control antennas for performance accordingly. For instance, RF transmit power may be boosted for performance when the arrangement of an accessory to a host is in the angle ranges 504 and 506 shown in FIG. 5.

An angle range 508 is also illustrated in which the computing device 102 and accessory device 104 are manipulated one to another such that a backside of the computing device 102 (e.g., side opposite the display side) is folded around into relatively close proximity and/or contact with a backside of the accessory 104. This arrangement corresponds to another closed position in which a back surface (e.g., side opposite the input side) of the accessory device 104 may cover a back surface (e.g., side opposite of display side) of the computing device 102. Thus, if the computing device 102 is positioned at an angle within the angle range 508 relative to the accessory device 104, the computing device 102 can again be determined to be in a closed position. Accordingly, the SAR manager module 116 may recognize that the accessory device 104 is positioned in an arrangement that adversely affects SAR compliance and may take action to control antennas for SAR compliance accordingly.

Having discussed some example SAR mitigation details, consider example procedures in accordance with one or more implementations.

Example Procedures

The following discussion describes SAR mitigation techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks.

Figure 6:
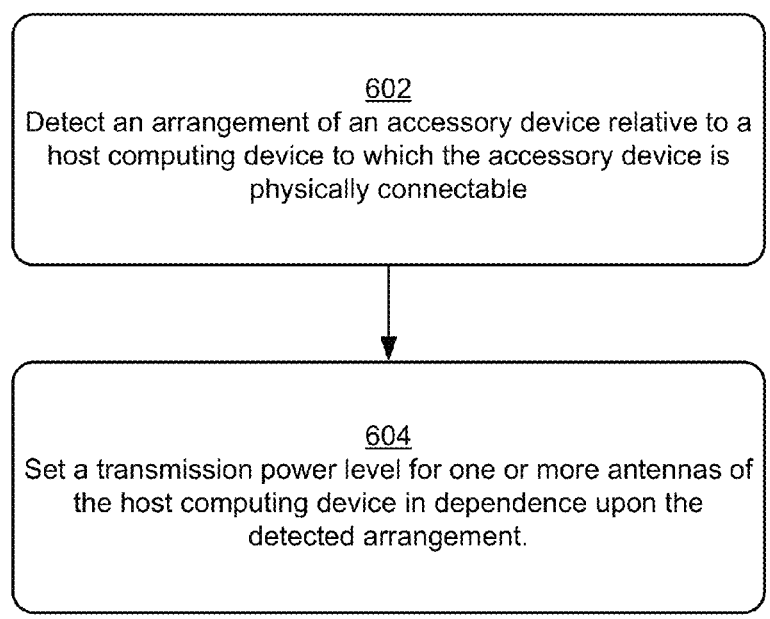
FIG. 6 is a flow diagram that describes an example procedure in which antennas are controlled in dependence upon a detected accessory device arrangement.

FIG. 6 depicts an example procedure 600 in which antennas for a host device are controlled in dependence upon arrangement of an accessory device. An arrangement of an accessory device relative to a host computing device to which the accessory device is physically connectable is detected (block 602). For example, one or more accessory sensors 120 may be employed to recognize an arrangement of an accessory as previously discussed. An arrangement may encompass the location of connection and/or an orientation for an accessory device relative to the host computing device. As described above and below, additional information such as an accessory identity and/or user presence indications may also be employed along with a detected accessory arrangement to determine when and how to implement SAR mitigation actions. A variety of different arrangements are contemplated at least some of which may negatively impact SAR compliance if mitigation actions are not taken. Thus, detection of such arrangements may trigger control actions to adapt antenna operation for compliance. On the other hand some arrangements have no substantial impact on SAR compliance in which case antennas may be controlled to optimize performance. Accordingly, antenna operation may be modified in various ways based upon an arrangement of an accessory device that is detected.

In particular, a transmission power level is set for one or more antennas of the host computing device in dependence upon the detected arrangement (block 604). For example, the SAR manager module 116 may be operable to recognize particular arrangements of different accessories based on information obtained via the accessory sensors 120. The SAR manager module 116 may then modify transmission power levels and/or other operational parameters for one or more antennas 114 of a host device accordingly. This may include, reducing transmission power levels for SAR compliance in response to detection of some arrangements and boosting transmission power levels for performance in response to detection of some other arrangements. Moreover, different antennas may be controlled individually based on the accessory arrangement such that for a given arrangement one or more selected antennas having the potential to cause excessive SAR conditions may be controlled for compliance (e.g., reduce energy output/power level) while in the same arrangement other antennas (e.g., antennas that do not contribute to excess SAR conditions) may continue to operate "normally" and/or may be boosted for performance. In at least some embodiments, a maximum transmission power level for may be established for each antenna with respect to different arrangements of a particular accessory device and individually with respect to different accessory device. Accordingly, setting of transmission power levels may involve enforcing a maximum transmission power level for each antenna established with respect to a detected arrangement an accessory device.

In order to selectively control antennas in dependence on accessory arrangement, the SAR manager module 116 may include or otherwise make use of any suitable information that associates particular arrangements of different accessories with operational parameters for one or more antennas 114. For example, the SAR manager module 116 may reference a table, database, data file, library, or other data structure that maps transmission power level ranges/maximums for individual antennas to different accessory arrangements in order to determine transmission power levels to set for a detected arrangement. The mapping data structure may be defined to associate antenna operational parameters and/or corresponding control actions with accessory arrangements for each different accessory based on accessory identification data. Thus, given an accessory device identity and information regarding a current arrangement, the SAR manager module 116 may look-up corresponding antenna operational parameters and selectively control antennas 114 accordingly. For example, the SAR manager module 116 may apply a SAR mitigation algorithm to control antennas 114 further details of which are described in relation to the following figure.

Figure 7:
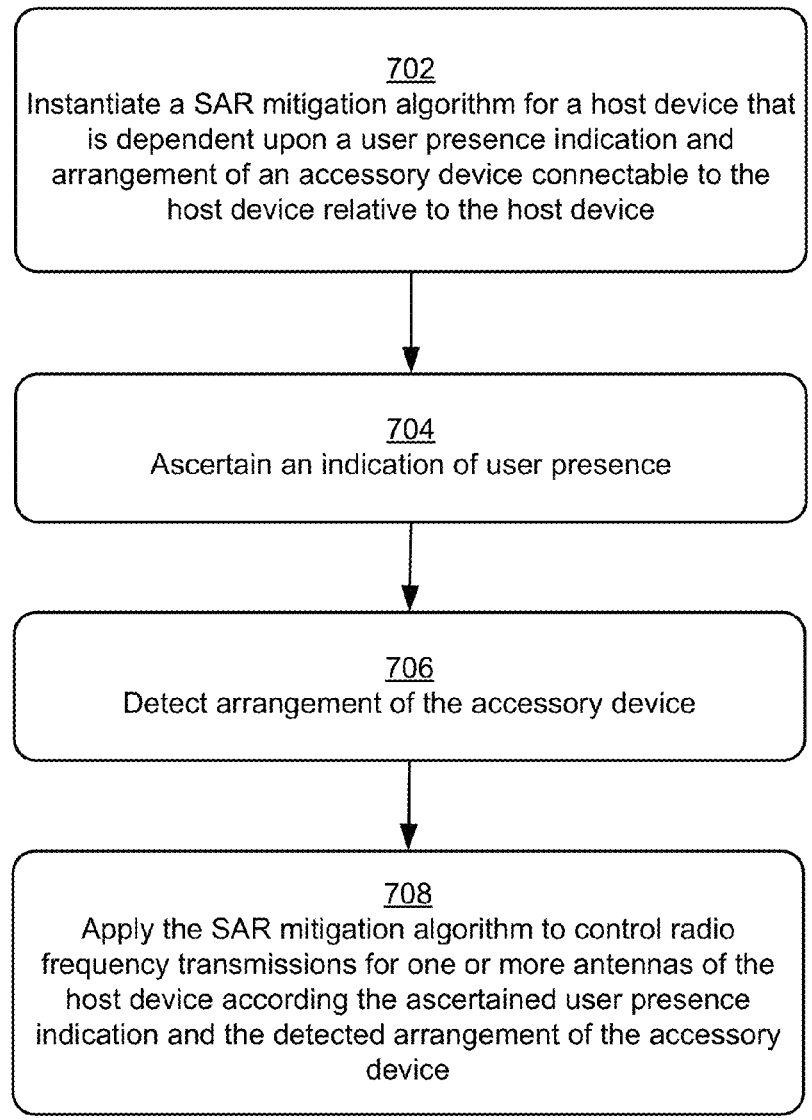
FIG. 7 is a flow diagram that describes an example procedure in which a SAR mitigation algorithm is applied to selectively control antennas of a host device.

FIG. 7 depicts an example procedure 700 in which a specific absorption rate (SAR) mitigation algorithm is applied to control one or more antennas of a host computing device. A SAR mitigation algorithm for a host computing device is instantiated that is dependent upon a user presence indication and arrangement of an accessory device connectable to the host device relative to the host device (block 702). For example, the SAR mitigation may be implemented and applied by a SAR manager module to effectuate techniques for SAR mitigation described herein. Generally speaking, the SAR mitigation algorithm is configured to indicate control actions to take with respect to one or more antennas in relation to different conditions. The conditions may include at least whether or not a user is present with respect to individual antennas and/or a current arrangement of an accessory device relative to a host. As noted, an identity of the accessory device is another condition that may be obtained and used in conjunction with the detected arrangement/user presence indications to ascertain how and when to control antenna operations for SAR mitigation and/or performance.

For instance, the identity may be indicative of accessory device properties at least some of which may impact SAR compliance. For instance, properties including but not limited to accessory type, location of connections, materials of construction, hardware aspects, emission contributions, and so forth may be associated with identities of different accessories. Given an accessory device identity and corresponding properties, effects of the accessory device on SAR compliance in different arrangements may be determined. A SAR mitigation algorithm may then be defined accordingly. In at least some implementations, the SAR mitigation algorithm may be configured to include a mapping data structure as mentioned above that associates various conditions (e.g., user presence, accessory identification, and/or accessory arrangement) with various antenna control actions.

An indication of user presence is ascertained (block 704). User presence may be detected via one or more user presence detectors 118 in the manner previously described. As noted, the presence of the user is determined with respect to proximity of the user to individual antennas. Thus, a user may be present with respect to some antennas of a device (e.g., hand holding device at or near to an antenna location) and at the same time the user may be considered not present with respect to other antennas located in a different part of the device.

Arrangement of the accessory device is detected (block 706). Again, one or more accessory sensors 120 may be employed to recognize an arrangement of an accessory using the techniques described herein. Then, the SAR mitigation algorithm is applied to control radio frequency transmissions for one or more antennas of the host device according the ascertained user presence indication and the detected arrangement of the accessory device (block 708). The operation of one or more antennas 114 may be controlled in various ways. In general, the SAR mitigation algorithm is configured to implement a control scheme that accounts for conditions including but not limited to user presence, accessory identity, and/or accessory arrangement as discussed above. The SAR mitigation algorithm is further designed to maintain compliance with SAR limits while permitting always on always connected (AOAC) features for wireless communication systems in the presence of different accessory device.

By way of example and not limitation, antenna control actions designated by the SAR mitigation algorithm may include but are not limited to setting transmission power limits, throttling of one or more antennas or types of antennas, prioritization of antenna communications, power back-off adjustments, as well as intentional radio degradation and/or radiation pattern modifications achieved through programmable elements (e.g., counter-measure devices), to name a few examples. One or more control actions to mitigate potential for exceeding legal SAR limits may be applied for antennas that contribute to SAR emissions. On the other hand, control actions to boost or maintain performance may be applied for antennas that do not significantly contribute to SAR emissions because of antenna location, user presence relationships, and, accessory device arrangement. Generally antennas that contribute and do not contribute to potential excessive SAR emissions may be identified based on user presence indications for individual antennas and the accessory arrangement. The antennas identified as contributor and non-contributor to SAR emissions for a given scenario may then be controlled on an individual basis for compliance considerations and performance considerations, respectively.

Naturally, control actions may be intelligently implemented based upon the current state of antenna operations rather than by simply setting overly cautious maximums or applying fixed back-off percentages or values. For example, power may be reduced for an antenna in response to user presence/accessory arrangement detection when the transmit power is above a defined threshold to trigger mitigation. On the other hand, the power may not be reduced when transmit power is below the defined threshold even though the user is present and a particular accessory arrangement is detected. The reduction may therefore depend upon the current operational conditions of an antenna. Moreover, different antennas may be controlled differently based on location, type of antenna, priority, user presence, and other contextual conditions rather than applying blanket across the board adjustments to each antenna.

In accordance with the foregoing description, a SAR mitigation algorithm may be implemented to control radio frequency transmissions (e.g., output levels) for one or more antennas of the host device based at least in part upon an arrangement of an accessory device relative to the host device. By so doing, the SAR mitigation algorithm accounts for adverse influences that some arrangements of accessory devices may have upon radio frequency (RF) emissions from the antennas. The SAR mitigation algorithm may be further configured to account for user presence indications along with accessory device arrangement and accessory device identity to adapt transmission power levels accordingly.

Having considered the foregoing example procedures, consider now a discussion of example systems and devices that may be employed to implement aspects of techniques in one or more embodiments.

Example System and Device

Figure 8:
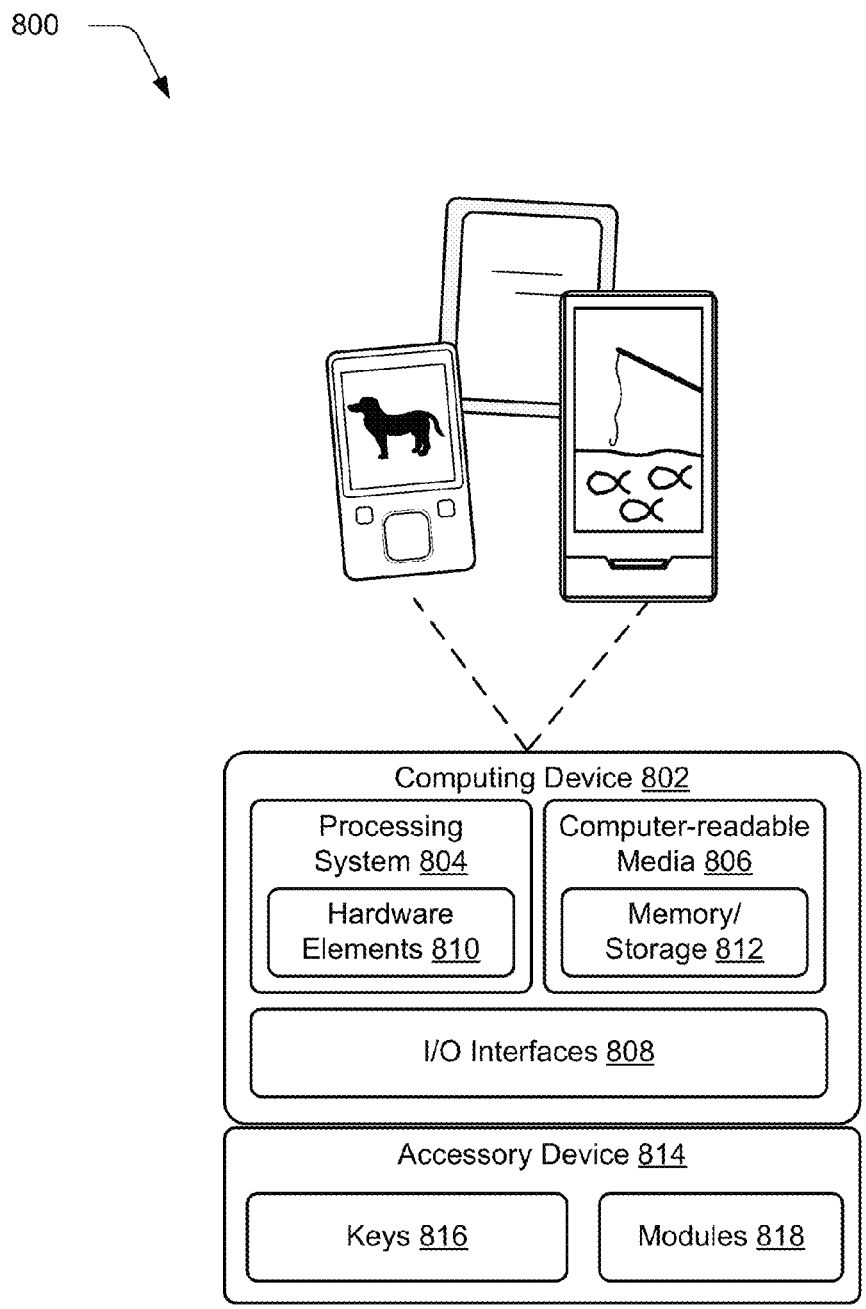
FIG. 8 illustrates an example system including various components of an example device that can be implemented as any type of computing device as described with reference to FIGS. 1-7 to implement techniques described herein.

FIG. 8 illustrates an example system generally at 800 that includes an example computing device 802 that is representative of one or more computing systems and/or devices that may implement the various techniques described herein. The computing device 802 may, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways to support user interaction.

The computing device 802 is further illustrated as being communicatively and physically coupled to an accessory device 814 that is physically and communicatively removable from the computing device 802. In this way, a variety of different accessory devices may be coupled to the computing device 802 having a wide variety of configurations to support a wide variety of functionality. In this example, the accessory device 814 includes one or more controls 816, which may be configured as press-sensitive keys, mechanically switched keys, buttons, and so forth.

The accessory device 814 is further illustrated as including one or more modules 818 that may be configured to support a variety of functionality. The one or more modules 818, for instance, may be configured to process analog and/or digital signals received from the controls 816 to determine whether an input was intended, determine whether an input is indicative of resting pressure, support authentication of the accessory device 814 for operation with the computing device 802, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, microcontroller devices, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable media described previously.

Combinations of the foregoing may also be employed to implement various techniques described herein. Accordingly, software, hardware, or executable modules may be implemented as one or more instructions and/or logic embodied on some form of computer-readable media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable media and/or hardware elements 810 of the processing system 804. The instructions and/or functions may be executable/operable by one or more articles of manufacture (for example, one or more computing devices 802 and/or processing systems 804) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A computing device comprising:
   one or more antennas configured to provide wireless communication functionality;
   one or more hardware elements configured to implement a specific absorption rate manager module operable to:
   instantiate a SAR mitigation algorithm for a host device that is dependent upon user presence indications and arrangement of an accessory device connectable to the computing device relative to the computing device;
   ascertain indications of user presence with respect to the one or more antennas;
   detect the arrangement of the accessory device relative to the computing device; and
   apply the SAR mitigation algorithm to control radio frequency transmissions for the one or more antennas of the computing device according the ascertained user presence indications and the detected arrangement of the accessory device, including referencing a mapping data structure to determine antenna operational parameters associated with the arrangement that is detected.

2. The computing device as described in claim 1, further comprising:
   one or more user presence detectors operable to ascertain the indications of user presence; and
   one or more accessory detectors to detect the arrangement of the accessory device relative to the computing device.

3. The computing device as described in claim 1, wherein the arrangement encompasses a location of a connection for the accessory device and an orientation of the accessory device relative to the computing device.

4. The computing device described in claim 1, wherein application of the specific absorption rate (SAR) mitigation algorithm comprises applying one or more control actions to mitigate potential for exceeding legal SAR limits for antennas identified as being SAR emission contributors based on the ascertained user presence indications and the detected arrangement of the accessory device.

5. The computing device described in claim 1, wherein application of the specific absorption rate (SAR) mitigation algorithm comprises applying one or more control actions to boost or maintain performance for antennas identified as being non-contributors to SAR emissions based on the ascertained user presence indications and the detected arrangement of the accessory device.

6. The computing device described in claim 1, wherein the mapping data structure is configured to indicate, for each particular antenna of the one or more antennas, control actions to take in relation to conditions including at least whether or not a user is present with respect to the particular antenna and the arrangement of the accessory device relative to the computing device.

7. A method implemented by a computing device to control one or more antennas of the computing device configured to provide wireless communication functionality comprising:
   instantiating by the computing device a SAR mitigation algorithm that is dependent upon user presence indications and arrangement of an accessory device connectable to the computing device relative to the computing device;
   ascertaining indications of user presence with respect to the one or more antennas;
   detecting the arrangement of the accessory device relative to the computing device; and
   applying the SAR mitigation algorithm to control radio frequency transmissions for the one or more antennas of the computing device according the ascertained user presence indications and the detected arrangement of the accessory device including applying antenna control actions for the one or more antennas specified for the detected arrangement by a mapping data structure defined to associate antenna operational parameters with different accessory arrangements.

8. The method as described in claim 7, further comprising:
   ascertaining the indications of user presence via one or more user presence detectors of the computing device; and
   detecting the arrangement of the accessory device relative to the computing device via one or more accessory detectors.

9. The method as described in claim 7, wherein detecting the arrangement comprises identifying a location of a connection for the accessory device and an orientation of the accessory device relative to the computing device.

10. The method as described in claim 7, wherein applying the specific absorption rate (SAR) mitigation algorithm comprises applying one or more control actions to mitigate potential for exceeding legal SAR limits for antennas identified as being SAR emission contributors based on the ascertained user presence indications and the detected arrangement of the accessory device.

11. The method as described in claim 7, wherein applying of the specific absorption rate (SAR) mitigation algorithm comprises applying one or more control actions to boost or maintain performance for antennas identified as being non-contributors to SAR emissions based on the ascertained user presence indications and the detected arrangement of the accessory device.

12. The method as described in claim 7, wherein the specific absorption rate (SAR) mitigation algorithm is configured to indicate, for each particular antenna of the one or more antennas, control actions to take in relation to conditions including at least whether or not a user is present with respect to the particular antenna and the arrangement of the accessory device relative to the computing device.

13. The method as described in claim 7, wherein applying the specific absorption rate (SAR) mitigation algorithm further comprises performing a look-up in the mapping data structure to identify the antenna control actions indicated for the one or more antennas with respect to the ascertained indications of user presence and the detected arrangement.

14. The method as described in claim 13, wherein the mapping data structure is configured to associate antenna operational parameters and corresponding control actions with accessory device arrangements for multiple different accessory devices connectable to the computing device at different times via the interface.

15. A computing device to control one or more antennas of the computing device configured to provide wireless communication functionality comprising:
   a processing system;
   an interface to communicatively and physically couple different accessory devices to the computing device;
   multiple antennas to provide wireless communication functionality;
   one or more computer readable media comprising instructions that, when executed via the processing system, implement a specific absorption rate (SAR) mitigation algorithm configured to perform operations to control operations of the multiple antennas in dependence upon user presence indications and arrangement of an accessory device connectable to the computing device relative to the computing device comprising:
      ascertaining indications of user presence with respect to the one or more antennas;
      detecting the arrangement of the accessory device relative to the computing device; and
      identifying antenna control actions indicated for the one or more antennas with respect to the ascertained indications of user presence and the detected arrangement by referencing a mapping data structure configured to associate antenna operational parameters and corresponding control actions with accessory device arrangements for multiple different accessory devices.

16. The computing device as described in claim 15, further comprising:
   ascertaining the indications of user presence via one or more user presence detectors of the computing device; and
   detecting the arrangement of the accessory device relative to the computing device via one or more accessory detectors.

17. The computing device as described in claim 15, wherein detecting the arrangement comprises identifying a location of a connection for the accessory device and an orientation of the accessory device relative to the computing device.

18. The computing device as described in claim 15, further comprising:
   applying one or more control actions that are identified to mitigate potential for exceeding legal SAR limits for antennas identified as being SAR emission contributors based on the ascertained user presence indications and the detected arrangement of the accessory device; and
   applying one or more control actions that are identified to boost or maintain performance for antennas identified as being non-contributors to SAR emissions based on the ascertained user presence indications and the detected arrangement of the accessory device.

19. The computing device as described in claim 15, wherein the specific absorption rate (SAR) mitigation algorithm is configured to indicate, for each particular antenna of the one or more antennas, control actions to take in relation to conditions including at least whether or not a user is present with respect to the particular antenna and the arrangement of the accessory device relative to the computing device.

* * * * *